United States Patent
Mo et al.

(10) Patent No.: US 12,314,511 B2
(45) Date of Patent: May 27, 2025

(54) TOUCH DISPLAY APPARATUS AND TOUCH DETECTION METHOD

(71) Applicant: HUAWEI TECHNOLOGIES CO., LTD., Guangdong (CN)

(72) Inventors: Jiabao Mo, Dongguan (CN); Yang Zou, Dongguan (CN); Junyong Zhang, Dongguan (CN); Tawei Kuo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/576,528

(22) PCT Filed: Jul. 4, 2022

(86) PCT No.: PCT/CN2022/103665
§ 371 (c)(1),
(2) Date: Jan. 4, 2024

(87) PCT Pub. No.: WO2023/280111
PCT Pub. Date: Jan. 12, 2023

(65) Prior Publication Data
US 2024/0310950 A1   Sep. 19, 2024

(30) Foreign Application Priority Data

Jul. 7, 2021 (CN) .......................... 202110767391.X
Dec. 31, 2021 (CN) .......................... 202111662224.5

(51) Int. Cl.
G06F 3/041 (2006.01)
G06F 3/044 (2006.01)

(52) U.S. Cl.
CPC ........ G06F 3/04166 (2019.05); G06F 3/0412 (2013.01); G06F 3/04164 (2019.05);
(Continued)

(58) Field of Classification Search
CPC .............. G06F 3/04166; G06F 3/0412; G06F 3/04164; G06F 3/0443; G06F 3/0446; G06F 2203/04104
See application file for complete search history.

(56) References Cited

U.S. PATENT DOCUMENTS 9,092,097 B2 * 7/2015 Kang .................... G06F 3/0446
11,068,087 B2 * 7/2021 Jeon ...................... G06F 3/0446
(Continued)

FOREIGN PATENT DOCUMENTS

CN          102096499 A     6/2011
CN          104765501 A     7/2015
(Continued)

OTHER PUBLICATIONS

International Search Report and Written Opinion in International Appln. No. PCT/CN2022/103665, mailed on Sep. 2, 2022, 17 pages (with English translation).
(Continued)

*Primary Examiner* — Amy Onyekaba
(74) *Attorney, Agent, or Firm* — Fish & Richardson P.C.

(57) ABSTRACT

An example touch display apparatus includes a touch display panel including one or more touch areas. Each touch area can include touch structures, where each touch structure includes first touch electrodes arranged along a first direction and second touch electrodes arranged along a second direction. Each first touch electrode can include first electrode blocks arranged along the second direction. Each second touch electrode can include second electrode blocks arranged along the first direction. The display apparatus can further include at least one touch driver chip, where one touch driver chip is electrically connected to a touch signal line connected to touch structures in one touch area.

20 Claims, 15 Drawing Sheets

(52) U.S. Cl.
CPC .......... *G06F 3/0443* (2019.05); *G06F 3/0446* (2019.05); *G06F 2203/04104* (2013.01)

(56) References Cited

U.S. PATENT DOCUMENTS

| | | | |
|---|---|---|---|
| 11,099,677 B2* | 8/2021 | Lee | H10K 59/12 |
| 11,762,489 B2* | 9/2023 | Guo | G06F 3/0412 |
| | | | 345/174 |
| 2011/0141040 A1* | 6/2011 | Kang | G06F 3/0446 |
| | | | 345/173 |
| 2012/0229416 A1 | 9/2012 | Ku et al. | |
| 2016/0364060 A1* | 12/2016 | Wang | G06F 3/0412 |
| 2017/0131816 A1* | 5/2017 | Zou | G06F 3/0448 |
| 2017/0228068 A1* | 8/2017 | Pu | G06F 3/04164 |
| 2020/0333906 A1* | 10/2020 | Lu | H10K 59/40 |
| 2021/0064212 A1* | 3/2021 | Huang | G06F 3/04164 |
| 2021/0208732 A1* | 7/2021 | Mu | G06F 3/0412 |
| 2021/0365148 A1* | 11/2021 | Wang | G06F 3/0412 |
| 2022/0029138 A1* | 1/2022 | Wang | H10K 50/865 |
| 2022/0276741 A1* | 9/2022 | Ye | G06F 3/0448 |
| 2022/0357816 A1* | 11/2022 | Wen | G09G 3/035 |
| 2023/0061413 A1* | 3/2023 | Zhang | G06F 3/0446 |
| 2023/0065926 A1* | 3/2023 | Kuo | G06F 3/0446 |
| 2023/0325015 A1* | 10/2023 | Fang | H10K 59/40 |
| | | | 345/174 |
| 2023/0333696 A1* | 10/2023 | Li | G06F 3/041 |
| 2023/0350516 A1* | 11/2023 | Wang | H10K 59/873 |
| 2024/0427442 A1* | 12/2024 | Li | G06F 3/04164 |
| 2025/0028406 A1* | 1/2025 | Zhang | G06F 3/0446 |

FOREIGN PATENT DOCUMENTS

| | | |
|---|---|---|
| CN | 105093025 A | 11/2015 |
| CN | 106502489 A | 3/2017 |
| CN | 107153289 A | 9/2017 |
| CN | 108415623 A | 8/2018 |
| CN | 110321024 A | 10/2019 |
| CN | 110347278 A | 10/2019 |
| CN | 110347280 A | 10/2019 |
| JP | 2009009249 A | 1/2009 |
| WO | 2017181749 A1 | 10/2017 |

OTHER PUBLICATIONS

Extended European Search Report in European Appln. No. 22836862.7, mailed on Aug. 30, 2024, 10 pages.

* cited by examiner

TOUCH DISPLAY APPARATUS AND TOUCH DETECTION METHOD

CROSS-REFERENCE TO RELATED APPLICATIONS

This application is a National Stage of International Application No. PCT/CN2022/103665, filed on Jul. 4, 2022, which claims priority to Chinese Patent Application No. 202110767391.X, filed on Jul. 7, 2021, and Chinese Patent Application No. 202111662224.5, filed on Dec. 31, 2021. All of the aforementioned applications are hereby incorporated by reference in their entirety.

TECHNICAL FIELD

The present invention relates to the field of touch technologies, and more specifically, to a touch display apparatus and a touch detection method.

BACKGROUND

Currently, a touch function has become one of standard configurations of most display apparatuses. A touch display apparatus usually uses capacitive touch, infrared touch, and resistive touch. The capacitive touch is more widely applied because of excellent features such as being capable of implementing multi-point touch.

The capacitive touch includes out-cell touch and embedded touch. The embedded touch is also referred to as in-cell touch, and is to embed a touch panel into a liquid crystal display panel, so that the liquid crystal display panel has both display and touch functions. However, for an existing embedded touch display apparatus, especially a large-sized touch display apparatus, a quantity of touch channels is large, and a quantity of required touch driver chips is also large. Therefore, problems such as high costs and a large frame width exist.

SUMMARY

In view of this, this application provides a touch display apparatus and a touch detection method, to effectively improve touch detection precision, reduce costs, and simplify an architecture simultaneously.

According to a first aspect, an embodiment of this application provides a touch display apparatus, including:
 a touch display panel, where the touch display panel includes at least one touch area, the touch area includes a plurality of touch structures, the touch structure includes a plurality of first touch electrodes arranged along a first direction and a plurality of second touch electrodes arranged along a second direction, the first touch electrodes and the second touch electrodes are disposed at a same layer and are insulated, and the first direction intersects the second direction, where
 the first touch electrode includes a plurality of first electrode blocks arranged along the second direction, two adjacent first electrode blocks are connected through a connection part, and one first touch electrode is electrically connected to one touch signal line, the second touch electrode includes a plurality of second electrode blocks arranged along the first direction, and the plurality of second electrode blocks in one second touch electrode are electrically connected to one touch signal line; and
 at least one touch driver chip, where one touch driver chip is electrically connected to a touch signal line connected to touch structures in one touch area.

In this embodiment of the present invention, area division is performed on the touch display panel, and a plurality of independent touch structures are disposed in each touch area obtained through the division, so that touch detection precision of the touch display apparatus can be improved, and in particular, touch detection precision of a large-sized touch display apparatus under multi-finger touch can be improved. Specifically, each touch area includes a plurality of independent touch structures, and the touch driver chip may separately detect a touch status in a detection area in which each touch structure is located. When multi-finger touch is performed, because an area of the detection area corresponding to each touch structure is small, a plurality of fingers are more likely to be placed in detection areas in which different touch structures are located, so that the touch driver chip can more accurately learn of touch point coordinates of different finger touch positions when separately performing determining in each detection area, and a risk of misjudgment is reduced.

In addition, in this embodiment of the present invention, a plurality of first electrode blocks belonging to a same first touch electrode are electrically connected to a same touch signal line, and a plurality of second electrode blocks belonging to a same second touch electrode are also electrically connected to a same touch electrode line. When a quantity of electrode blocks is fixed, a quantity of touch signal lines connected to the electrode blocks is reduced, in other words, a quantity of touch channels is reduced. In this case, a quantity of analog front end (AFE) devices and touch driver chips that are configured to process a touch signal in the touch display apparatus may be correspondingly reduced.

In addition, by reducing a quantity of touch signal lines and a quantity of touch driver chips, space that needs to be occupied by the touch signal lines and the touch driver chips in a frame of the touch display panel is further reduced. This is more conducive to implementing a narrow frame design of the touch display apparatus.

Moreover, based on the foregoing structure, the touch driver chip only needs to simultaneously receive touch detection signals that are fed back through touch signal lines connected to the touch driver chip, to detect a touch status in a touch area. Time-sharing detection does not need to be performed, and detection duration is shorter. In addition, compared with a structure in which a touch switches are disposed in the current technology, time loss caused by switching between touch switches during time-sharing detection can also be avoided. When a touch electrode and a common electrode are multiplexed, refresh rates of touch and display are effectively improved, and touch and display effects are better.

In an implementation, the touch display panel includes a plurality of touch areas, and the plurality of touch areas are arranged along the second direction. In this case, the touch display panel is divided into the plurality of touch areas arranged along the second direction. Based on this area division manner, a touch signal line connected to a touch structure in each touch area can be connected to the touch driver chip only by further extending to a border area along the first direction. An extension length of the touch signal line is shorter and cabling is simpler. This reduces an attenuation degree of the touch detection signal and a common voltage signal when the touch detection signal and the common voltage signal are transmitted on the touch signal line, and further improves touch detection precision and a display effect.

Further, an orthographic projection of the touch signal line on a plane on which the touch display panel is located runs through an orthographic projection of a plurality of first touch electrodes that are on the touch display panel and that are arranged along the first direction on the plane on which the touch display panel is located.

In the foregoing disposing manner, regardless of whether a touch signal line is connected to a first touch electrode or a second touch electrode on a side far away from the touch driver chip, or connected to a first touch electrode or a second touch electrode on a side close to the touch driver chip, the touch signal line extends from the top of the touch area away from the touch driver chip to a position of the touch driver chip. In this case, extension lengths of a plurality of touch signal lines tend to be consistent. This effectively improves load uniformity of the touch signal lines. In this way, consistency of voltage drops of touch detection signals or common voltage signals transmitted on different touch signal lines is improved.

In a possible implementation, the first touch electrode and the second touch electrode are multiplexed as common electrodes.

The touch display panel further includes a sub-pixel, and the sub-pixel includes a pixel electrode. An orthographic projection of each pixel electrode on a plane on which the touch display panel is located is located in an orthographic projection of the first touch electrode or the second touch electrode on the plane on which the touch display panel is located.

An orthographic projection of a pixel electrode of each sub-pixel is located in the orthographic projection of the first touch electrode or the second touch electrode, so that a case in which some pixel electrodes do not overlap the touch electrode, or a part of a touch electrode overlaps the touch electrode, and a remaining part does not overlap the touch electrode may be avoided. In this way, a pixel electrode of each sub-pixel is ensured to completely overlap a common electrode corresponding to the pixel electrode. In this way, an electric field with equal strength is ensured to be formed between the pixel electrode of each sub-pixel and the common electrode, accuracy of a rotation angle of liquid crystal molecules is improved, and the display effect is improved.

Further, there is a gap between orthographic projections of any two adjacent pixel electrodes on the plane on which the touch display panel is located, and edges of orthographic projections of the first touch electrode and the second touch electrode on the plane on which the touch display panel is located are located in the gap, so that on a premise that the orthographic projection of the touch electrode is ensured to completely cover the orthographic projection of each pixel electrode, a gap is also reserved between an edge of the orthographic projection of the touch electrode and an edge of the orthographic projection of the pixel electrode. Even if a location of the touch electrode or the pixel electrode is slightly deviated due to a factor, for example, a process error, the orthographic projection of the touch electrode can still cover the orthographic projection of the pixel electrode, so that reliability of a relative location relationship between the pixel electrode and the touch electrode is improved.

In an implementation, patterns of the plurality of first electrode blocks after translation coincide, and patterns of the plurality of second electrode blocks after translation coincide. In this way, arrangement of touch electrodes in the entire panel is more regular. During touch detection, it is easier to convert locations of the first touch electrode and the second touch electrode in the panel into touch point coordinates, operation complexity is lower, and an operation result of the touch point coordinates is more accurate.

According to a second aspect, an embodiment of this application further provides another touch display apparatus, including:

a touch display panel, where the touch display panel includes a plurality of touch areas, the touch area includes a first touch area and a second touch area, the first touch area and the second touch area respectively include a plurality of touch structures; and a plurality of touch driver chips, where the touch driver chip includes a first touch chip and a second touch chip, the first touch chip is electrically connected to a touch signal line connected to the touch structure in the first touch area, and the second touch chip is electrically connected to a touch signal line connected to the touch structure in the second touch area.

In this embodiment of this application, area division is performed on the touch display panel, and a plurality of independent touch structures are disposed in each touch area obtained through the division, so that touch detection precision of the touch display apparatus can be improved, and in particular, touch detection precision of a large-sized touch display apparatus under multi-finger touch can be improved. Specifically, each touch area includes a plurality of independent touch structures, and the touch driver chip may separately detect a touch status in a detection area in which each touch structure is located. When multi-finger touch is performed, because an area of the detection area corresponding to each touch structure is small, a plurality of fingers are more likely to be placed in detection areas in which different touch structures are located, so that the touch driver chip can more accurately learn of touch point coordinates of different finger touch positions when separately performing determining in each detection area, and a risk of misjudgment is reduced.

In addition, based on the foregoing structure, a single touch driver chip only needs to simultaneously receive touch detection signals that are fed back through touch signal lines connected to the touch driver chip, to detect a touch status in a touch area, and a plurality of touch driver chips may alternatively simultaneously perform touch detection. Therefore, in this embodiment of this application, time-sharing detection does not need to be performed, and detection duration is shorter. In addition, a time loss caused by switching between touch switches can also be avoided, and a problem of low working reliability of a circuit caused by an on-resistance can be avoided.

In an implementation, the plurality of touch areas are arranged in a same direction, and an arrangement direction of the touch areas intersects an extension direction of the touch signal line. Based on the area division manner, a touch signal line connected to a touch structure in each touch area can be connected to the touch driver chip only by further extending to a border area along the first direction. An extension length of the touch signal line is shorter and cabling is simpler. This reduces an attenuation degree of the touch detection signal and a common voltage signal when the touch detection signal and the common voltage signal are transmitted on the touch signal line, and further improves touch detection precision and a display effect.

In an implementation, the touch structure includes a plurality of first touch electrodes and a plurality of second touch electrodes. The plurality of first touch electrodes are arranged along a first direction. The plurality of second touch electrodes are arranged along a second direction. The first touch electrodes and the second touch electrodes are disposed at a same layer and are insulated, and the first direction intersects the second direction.

The first touch electrode includes a plurality of first electrode blocks arranged along the second direction. Two adjacent first electrode blocks are connected through a connection part, and one first touch electrode is electrically connected to one touch signal line. The second touch electrode includes a plurality of second electrode blocks arranged along the first direction, and the plurality of second electrode blocks in one second touch electrode are electrically connected to one touch signal line.

In the foregoing structure, a plurality of first electrode blocks belonging to a same first touch electrode are electrically connected to a same touch signal line, and a plurality of second electrode blocks belonging to a same second touch electrode are also electrically connected to a same touch electrode line. When a quantity of electrode blocks is fixed, a quantity of touch signal lines connected to the electrode blocks is reduced, in other words, a quantity of touch channels is reduced. In this case, a quantity of analog front end (AFE) devices and touch driver chips that are configured to process a touch signal in the touch display apparatus may be correspondingly reduced.

In addition, by reducing a quantity of touch signal lines and a quantity of touch driver chips, space that needs to be occupied by the touch signal lines and the touch driver chips in a frame of the touch display panel is further reduced. This is more conducive to implementing a narrow frame design of the touch display apparatus.

In addition, in the foregoing structure, electrode blocks of both the first touch electrode and the second touch electrode do not need to be electrically connected through a bridge. Therefore, in this embodiment of this application, only a pattern design of a common electrode needs to be adjusted, so that the common electrode is cut into a plurality of independent first touch electrodes and second touch electrodes, and process flows of forming a bridge and a corresponding mask do not need to be added. Therefore, design costs of the panel are not increased, design complexity of the panel is not increased, and an application scope is effectively improved.

Further, in a direction of a plane on which the touch display panel is located, an orthographic projection of the touch signal line runs through orthographic projections of a plurality of first touch electrodes arranged along the first direction on the touch display panel.

In the foregoing disposing manner, regardless of whether a touch signal line is connected to the first touch electrode or the second touch electrode on a side far away from the touch driver chip, or connected to the first touch electrode or the second touch electrode on a side close to the touch driver chip, the touch signal line extends from a top of the touch area away from the touch driver chip to a position of the touch driver chip. In this case, extension lengths of a plurality of touch signal lines tend to be consistent, to effectively improve load uniformity of the touch signal lines. In this way, consistency of voltage drops of touch detection signals or common voltage signals transmitted on different touch signal lines is improved.

In an implementation, the touch structure includes a plurality of first touch electrodes and a plurality of second touch electrodes, and the first touch electrodes and the second touch electrodes are alternately arranged in a second direction.

The first touch electrode includes first electrode blocks arranged along a first direction, and one first electrode block is electrically connected to one touch signal line. The second touch electrode includes second electrode blocks arranged along the first direction, and one second electrode block is electrically connected to one touch signal line. The first direction intersects the second direction.

The first electrode block includes a first electrode part and a second electrode part that are arranged along the first direction. A width of the first electrode part in the second direction is less than a width of the second electrode part in the second direction. The second electrode block includes a third electrode part and a fourth electrode part that are arranged along the first direction. A width of the third electrode part in the second direction is greater than a width of the fourth electrode part in the second direction.

In the foregoing structure, widths of different positions of the first electrode block are different, and widths of different positions of the second electrode block are also different. Therefore, when a finger touches different positions of the first electrode block or the second electrode block in the first direction, capacitance change amounts of the first electrode block or the second electrode block are different. Especially in self-capacitance touch, a coordinate position of the finger in the first direction may be accurately determined based on the capacitance change amounts of the first electrode block or the second electrode block. Therefore, even if lengths of the first electrode block and the second electrode block in the first direction are set to be larger, it can still be ensured that the coordinate position of the finger in the first direction is accurately identified. Therefore, on the premise that high touch precision is achieved, in this embodiment of this application, sizes of the first electrode block and the second electrode block in the first direction may be increased, to reduce a quantity of electrode blocks that need to be disposed in the touch display apparatus, and correspondingly reduce a quantity of touch signal lines connected to the electrode blocks.

It can be learned that the foregoing structure can effectively reduce a quantity of touch channels, and quantities of analog front end (AFE) devices and touch driver chips that are configured to process a touch signal in the touch display apparatus can be correspondingly reduced. Especially for a large-sized touch display apparatus, a quantity of touch signal channels and a quantity of touch driver chips can be reduced to a greater extent, and a cost requirement and an architecture of the touch display apparatus are both effectively simplified.

In addition, by reducing a quantity of touch signal lines and a quantity of touch driver chips, space that needs to be occupied by the touch signal lines and the touch driver chips in a frame of the touch display panel is further reduced. This is more conducive to implementing a narrow frame design of the touch display apparatus.

Further, to improve detection precision of the coordinate position of the finger in the first direction to a greater extent, along the first direction, a width of the first electrode block in the second direction increases successively, and a width of the second electrode block in the second direction decreases successively.

Further, the touch signal line includes a first end part and a second end part, the first end part is electrically connected to the touch driver chip, and second end parts of a plurality of touch signal lines are aligned.

In this case, regardless of whether a touch signal line is connected to a first electrode block or a second electrode block on a side far away from the touch driver chip, or connected to a first touch electrode block or a second electrode block on a side close to the touch driver chip, the touch signal line extends from the top of the touch area away from the touch driver chip to a position of the touch driver chip. In this case, extension lengths of a plurality of touch signal lines tend to be consistent. This effectively improves load uniformity of the touch signal lines. In this way, consistency of voltage drops of touch detection signals or common voltage signals transmitted on different touch signal lines is improved.

In a possible implementation, the first touch electrode and the second touch electrode are multiplexed as common electrodes.

The touch display panel further includes a sub-pixel, and the sub-pixel includes a pixel electrode. An orthographic projection of each pixel electrode on a plane on which the touch display panel is located is located in an orthographic projection of the first touch electrode or the second touch electrode on the plane on which the touch display panel is located.

An orthographic projection of a pixel electrode of each sub-pixel is located in the orthographic projection of the first touch electrode or the second touch electrode, so that a case in which some pixel electrodes do not overlap the touch electrode, or a part of a touch electrode overlaps the touch electrode, and a remaining part does not overlap the touch electrode may be avoided. In this way, a pixel electrode of each sub-pixel is ensured to completely overlap a common electrode corresponding to the pixel electrode. In this way, an electric field with equal strength is ensured to be formed between the pixel electrode of each sub-pixel and the common electrode, accuracy of a rotation angle of liquid crystal molecules is improved, and the display effect is improved.

Further, there is a gap between orthographic projections of any two adjacent pixel electrodes on the plane on which the touch display panel is located, and in a direction of the plane on which the touch display panel is located, an edge of the orthographic projection of the first touch electrode and an edge of the orthographic projection of the second touch electrode are located in the gap, so that on a premise that the orthographic projection of the touch electrode is ensured to completely cover the orthographic projection of each pixel electrode, a gap is also reserved between an edge of the orthographic projection of the touch electrode and an edge of the orthographic projection of the pixel electrode. Even if a location of the touch electrode or the pixel electrode is slightly deviated due to a factor, for example, a process error, the orthographic projection of the touch electrode can still cover the orthographic projection of the pixel electrode, so that reliability of a relative location relationship between the pixel electrode and the touch electrode is improved.

In an implementation, patterns of the plurality of first electrode blocks after translation coincide, and patterns of the plurality of second electrode blocks after translation coincide. In this way, arrangement of touch electrodes in the entire panel is more regular. During touch detection, it is easier to convert locations of the first touch electrode and the second touch electrode in the panel into touch point coordinates, operation complexity is lower, and an operation result of the touch point coordinates is more accurate.

According to a third aspect, an embodiment of the present invention further provides a touch detection method, where the touch detection method is applied to the foregoing touch display apparatus, including: collecting, by a touch driver chip, a touch detection signal transmitted through a touch signal line, detecting a touch status at a location of each touch structure in a touch area, and calculating, based on the collected touch detection signal, a touch point coordinate.

The touch display panel is divided into areas, and a plurality of independent touch structures are disposed in each touch area obtained through division. Each independent touch structure is respectively corresponding to a detection area with a small area. The touch driver chip may separately detect a touch status in a detection area in which each touch structure is located. When performing independent determining in each detection area, it is easier for the touch driver chip to accurately obtain point coordinates of different finger touch positions, to reduce a risk of misjudgment and improve accuracy of the touch detection. In addition, in this embodiment of the present invention, the touch driver chip only needs to simultaneously receive touch detection signals that are fed back through touch signal lines connected to the touch driver chip, to detect a touch status in a touch area. Time-sharing detection does not need to be performed, and detection duration is shorter. This effectively improves refresh rates of touch and display, and touch and display effects are better.

In an implementation, that the touch driver chip collects the touch detection signal transmitted through the touch signal line, detects a touch status at a location of each touch structure in the touch area, and calculates a touch point coordinate based on the collected touch detection signal includes the following steps.

Step S1: Determine, based on a current application status of a touch display panel, whether multi-finger touch needs to be performed, and in a case that multi-finger touch needs to be performed, proceed to step S2, or in a case that multi-finger touch does not need to be performed, proceed to step S3.

Step S2: Determine, based on an interface currently displayed on the touch display panel, a touch area that a finger needs to touch, where a touch driver chip corresponding to the touch area part collects a touch detection signal, and calculates a touch point coordinate based on the collected touch detection signal.

Step S3: Each touch driver chip collects a touch detection signal and determines whether touch occurs in a corresponding touch area, and in a case that touch occurs in a corresponding touch area, a touch driver chip corresponding to the touch area in which touch occurs calculates a touch point coordinate based on the collected touch detection signal.

In an implementation, step S2 includes the following steps.

Step S21: Determine, based on the interface displayed on the touch display panel, whether a plurality of positions that need to be touched by a finger belong to a same touch area, and in a case that the plurality of positions that need to be touched by a finger belong to a same touch area, proceed to step S22, or in a case that the plurality of positions that need to be touched by a finger do not belong to a same touch area, proceed to step S23.

Step S22: A touch driver chip corresponding to the touch area collects a touch detection signal, and calculates a touch point coordinate based on the collected touch detection signal.

Based on a one-to-one correspondence between the touch area and the touch driver chip, when multi-finger touch is performed, in a case that a location that needs to be touched by a plurality of fingers is located only in one or more touch areas, touch detection may be performed by using only a touch driver chip corresponding to the part of touch areas in which the touch location is located, and it is unnecessary that all touch driver chips work, to reduce power consumption required for the touch detection.

Step S23: In the plurality of touch areas, a touch driver chip corresponding to each touch area collects a touch detection signal. When the at least two touch driver chips collect edge touch detection signals that include touch information, the touch detection signals collected by the at least two touch driver chips are combined to calculate a touch point coordinate. When the touch driver chip does not collect an edge touch detection signal that includes touch information, each touch driver chip calculates the touch point coordinate based on the collected touch detection signal respectively.

Further, in time of each frame, the touch driver chip records the calculated touch point coordinate and area position data of the touch area in which the touch occurs.

When the at least two touch driver chips collect the edge touch detection signals that include the touch information, the touch detection method further includes: correcting, based on the touch point coordinates and the area position data recorded in a previous frame, the touch point coordinates calculated in a current frame, to obtain actual touch point coordinates in the current frame.

In consideration of problems such as misjudgment, when the at least two touch driver chips collect the edge touch detection signals that include the touch information, a plurality of touch point coordinates calculated in the current frame may include coordinates of misjudgment. In this case, the touch point coordinates calculated in the current frame may be corrected with reference to a touch status in a previous frame, to obtain more accurate coordinates, and avoid a case in which a position that is not touched is also triggered.

DESCRIPTION OF EMBODIMENTS

Figure 1:
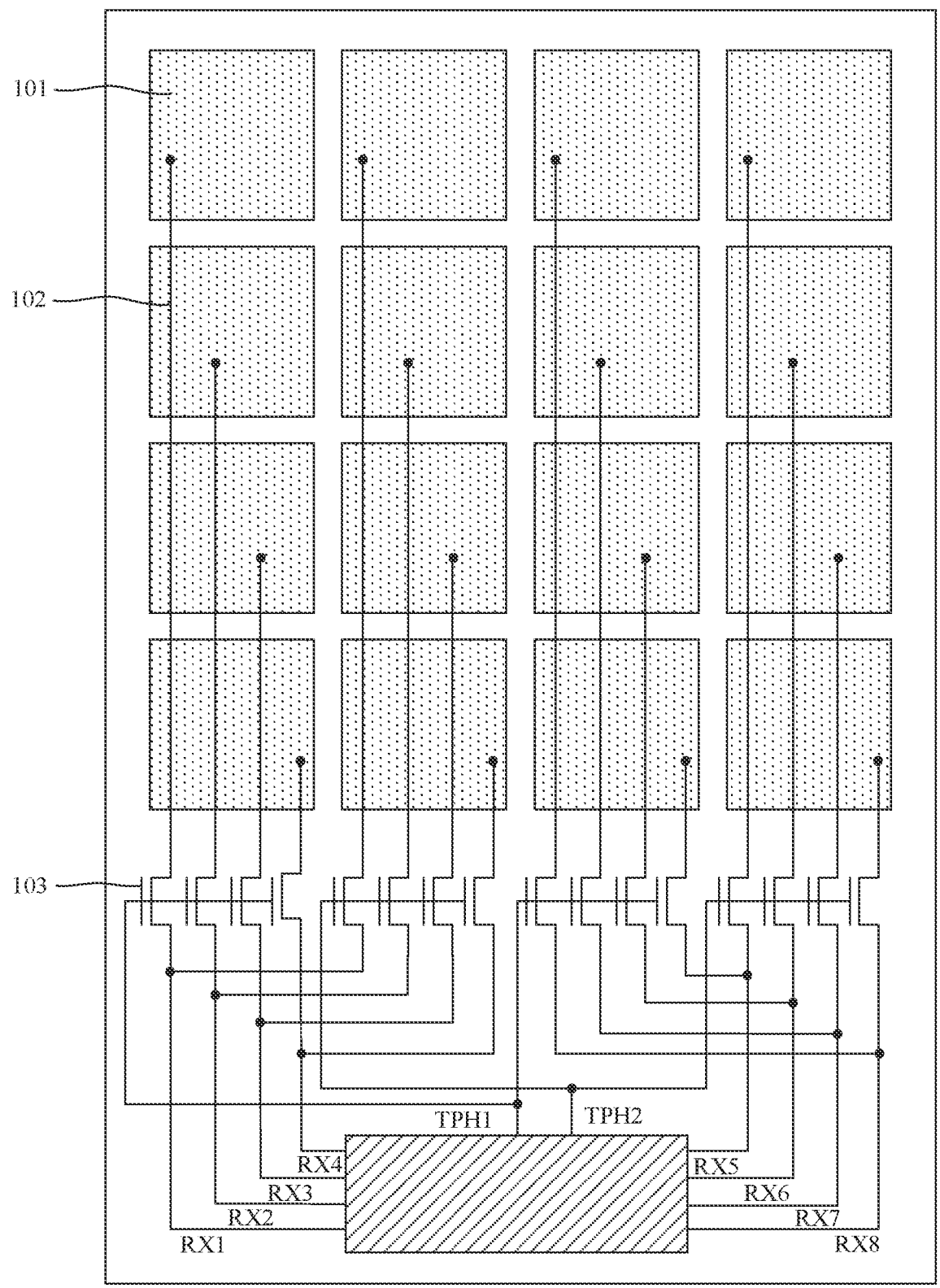
FIG. 1 is a schematic diagram of a structure of a touch display apparatus in the current technology.

To make the objectives, technical solutions, and advantages of embodiments of the present invention clearer, the following clearly and completely describes the technical solutions in embodiments of the present invention with reference to the accompanying drawings in embodiments of the present invention. It is clear that the described embodiments are some but not all of embodiments of the present invention. All other embodiments obtained by persons skilled in the art based on embodiments of the present invention without creative efforts shall fall within the protection scope of the present invention.

The terms used in embodiments of the present invention are merely for the purpose of illustrating specific embodiments, and are not intended to limit the present invention. The terms "a", "said" and "the" of singular forms used in embodiments and the appended claims of the present invention are also intended to include plural forms, unless otherwise specified in the context clearly.

Before the technical solutions of the present invention are described, the present invention first specifically describes a problem existing in a touch display apparatus in the current technology.

In an existing embedded touch display apparatus, a touch electrode is usually multiplexed with a common electrode. In a manufacturing process, the common electrode covered on an entire surface is cut into a plurality of independent electrode blocks arranged in a dot matrix manner. The electrode block part transmits a common voltage signal in a display time period, and is used to form an electric field used to drive rotation of liquid crystal with a pixel electrode. A touch signal is transmitted in the touch time period. A capacitance change amount of each electrode block is detected to determine a finger touch position.

As a size of the touch display apparatus continuously increases, to achieve specific touch detection precision, a quantity of touch electrodes in the touch display apparatus increases by hundreds of times, and correspondingly, a quantity of touch channels also increases greatly. In this case, more touch driver chips need to be disposed to connect to the touch channels. For example, in a 65-inch touch display apparatus, when a pitch between center points of touch electrodes is designed to be 4.5 mm, a total of 57600 touch channels are required. In this case, even if a source signal of 960 channels is used for time-sharing driving, 60 touch driver chips are still required. As a result, there are too many touch driver chips, and application of an embedded touch technology on a large-screen display apparatus is limited. In addition, as the quantity of touch signal lines and the quantity of touch driver chips increase greatly, a width of a frame of the touch display apparatus also increases accordingly, which also brings a great challenge to an architecture of the touch display apparatus.

In addition, from the perspective of the inside of the touch driver chip, the touch driver chip needs to use a time-sharing touch detection form, and the entire-screen touch needs to be performed for 8 to 12 times. As a result, duration of the entire-screen touch detection is increased. Because the touch electrode needs to be reused as a common electrode, the touch time period and the display time period need to be performed in a time-division manner in time of one frame. Therefore, an increase in touch detection duration has an adverse impact on refresh rates of touch and display.

However, an improved embedded touch display apparatus in the current technology still has some problems. The following uses two structures as examples for description.

First Existing Structure:

FIG. 1 is a schematic diagram of a structure of a touch display apparatus in the current technology. As shown in FIG. 1, the touch display apparatus includes a plurality of touch electrodes 101 arranged in a matrix manner, and each touch electrode is electrically connected to a first touch signal line 102 respectively. The touch display apparatus further includes: a plurality of touch switches 103 that are electrically connected to the plurality of first touch signal lines 102 in a one-to-one correspondence, at least two gating cables TPHs (TPH1 and TPH2), where the at least two gating cables TPHs are electrically connected to an enabling end of the touch switch 103; and a plurality of second touch signal lines RXs (RX1 to RX8), and one second touch signal line RX is electrically connected to at least two touch switches 103 simultaneously.

Figure 2:
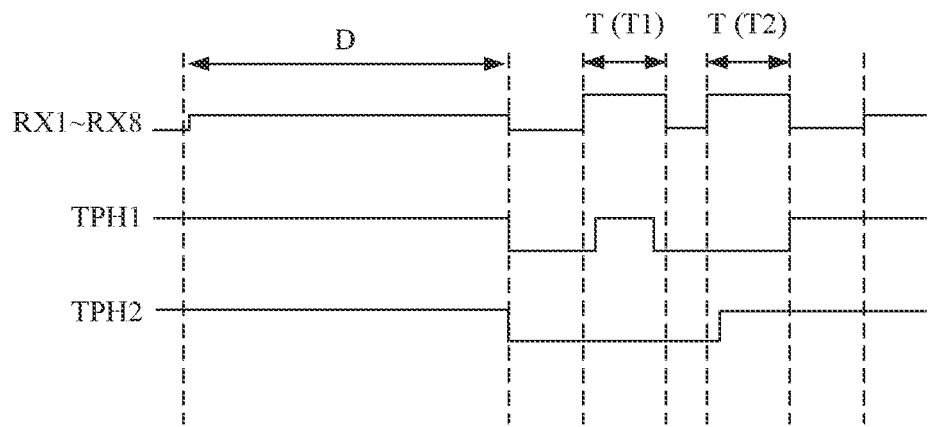
FIG. 2 is a sequence diagram corresponding to FIG. 1.

With reference to a signal sequence diagram shown in FIG. 2, time of one frame includes a display stage D and a touch stage T. The touch stage T includes a first touch sub-stage T1 and a second touch sub-stage T2. In the first touch sub-stage T1, the gating cable TPH1 outputs a high level to control a touch switch 103 connected to the gating cable TPH1 to be conducted, and the second touch signal lines RX1 to RX8 transmit touch signals to touch electrodes 101 in odd columns through the conducted control switch 103. In the second touch sub-stage T2, the gating cable TPH2 outputs the high level to control the touch switch 103 connected to the gating cable TPH2 to be conducted, and the second touch signal lines RX1 to RX8 transmit touch signals to touch electrodes 101 in even columns through the conducted touch switch 103.

In the foregoing structure, although a quantity of touch signal lines connected to the touch driver chip can be reduced by using the touch switches 103, a large quantity of touch switches 103 need to be added to the touch display panel, and the touch display apparatus still has problems of a large frame width and high costs. In addition, the touch switch 103 has a large on-resistance, and consequently, resistance balance of the circuit is poor. In addition, time-sharing touch detection still needs to be performed in this structure, and switching between the touch switches 103 needs to be performed during the time-sharing detection. The switching between the touch switches 103 further causes an additional time loss, resulting in longer touch detection time. In addition, because there is a time difference in time-sharing sampling between adjacent channels, problems such as a disconnection phenomenon in scenarios such as flicking, and a row-column noise difference in a determinant scanning scenario are caused.

Figure 3:
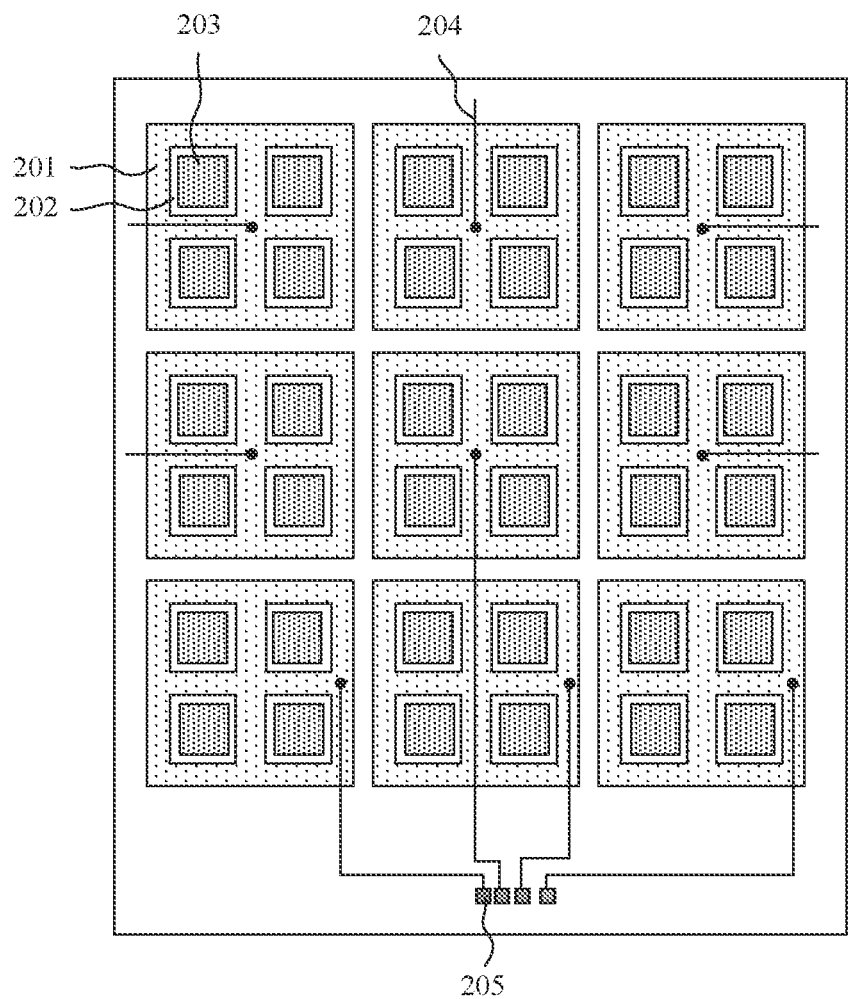
FIG. 3 is a schematic diagram of another structure of a touch display apparatus in the current technology.

Second Existing Structure:

FIG. 3 is a schematic diagram of another structure of a touch display apparatus in the current technology. As shown in FIG. 3, the touch display apparatus includes a plurality of self-capacitance electrodes 201, and the self-capacitance electrode 201 has a hollow area 202. The touch display apparatus further includes a common electrode 203 that is insulated from the self-capacitance electrodes 201 at a same layer and that is located in the hollow area 202. Each capacitor electrode 201 is electrically connected to a wire 204 respectively. A frame of the touch display panel has four sides. Each self-capacitance electrode 201 is connected to a nearest side by using a corresponding wire 204 on a basis that the wires 204 do not cross each other, and is electrically connected to a wiring terminal 205 of a touch driver chip.

In this structure, the hollow area 202 may be used to reduce an area of the self-capacitance electrode 201, to increase a capacitance change degree during touch, to improve touch sensitivity. Therefore, an overall occupied area of the self-capacitance electrode 201 may be set to be larger, to reduce a quantity of self-capacitance electrodes 201 in the touch display apparatus, and correspondingly reduce a quantity of wires 204 electrically connected to the self-capacitance electrode 201, in other words, reduce a quantity of touch channels. However, when the hollow area 202 is disposed, a touch pitch causes a decrease in touch precision linearity, and the like. Especially, during active pen touch, the hollow area 202 causes a decrease in a coupling signal between the active pen and the self-capacitance electrode 201, and consequently, causes an exception that the active pen cannot be used. In addition, the structure further affects a holding capacitance between the common electrode 203 and a pixel electrode, to affect display.

Therefore, an embodiment of the present invention provides a touch display apparatus. The touch display apparatus may be specifically an organic light-emitting diode (OLED) display apparatus, a liquid crystal display (LCD) apparatus, a micro light-emitting diode (micro LED) display apparatus, or the like. In addition, the touch display apparatus may be a rigid non-foldable display apparatus, or may be a flexible foldable display apparatus. An LCD display apparatus is used as an example for description in this embodiment of the present invention.

Figure 4:
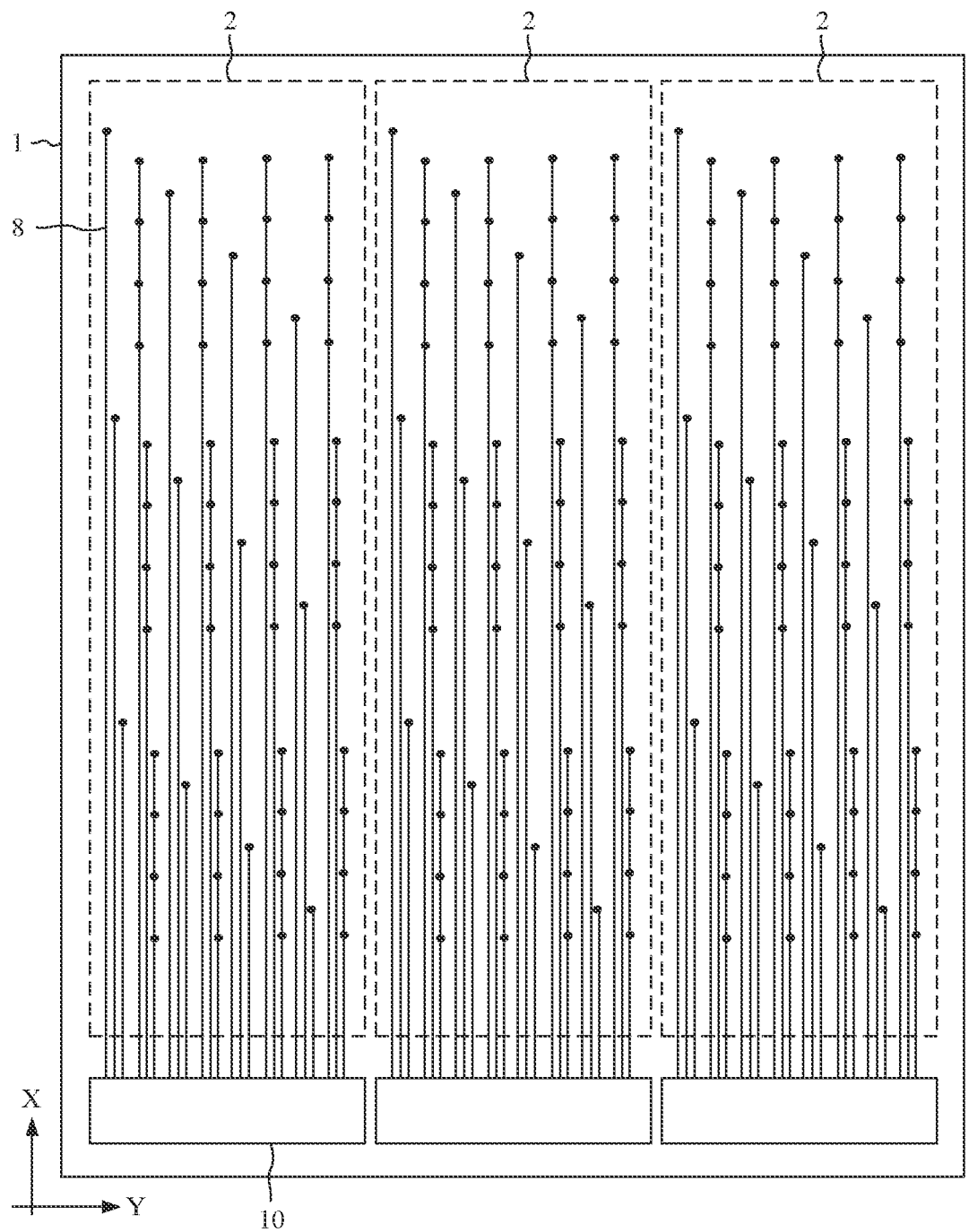
FIG. 4 is a schematic diagram of a structure of a touch display apparatus according to an embodiment of the present invention.
Figure 5:
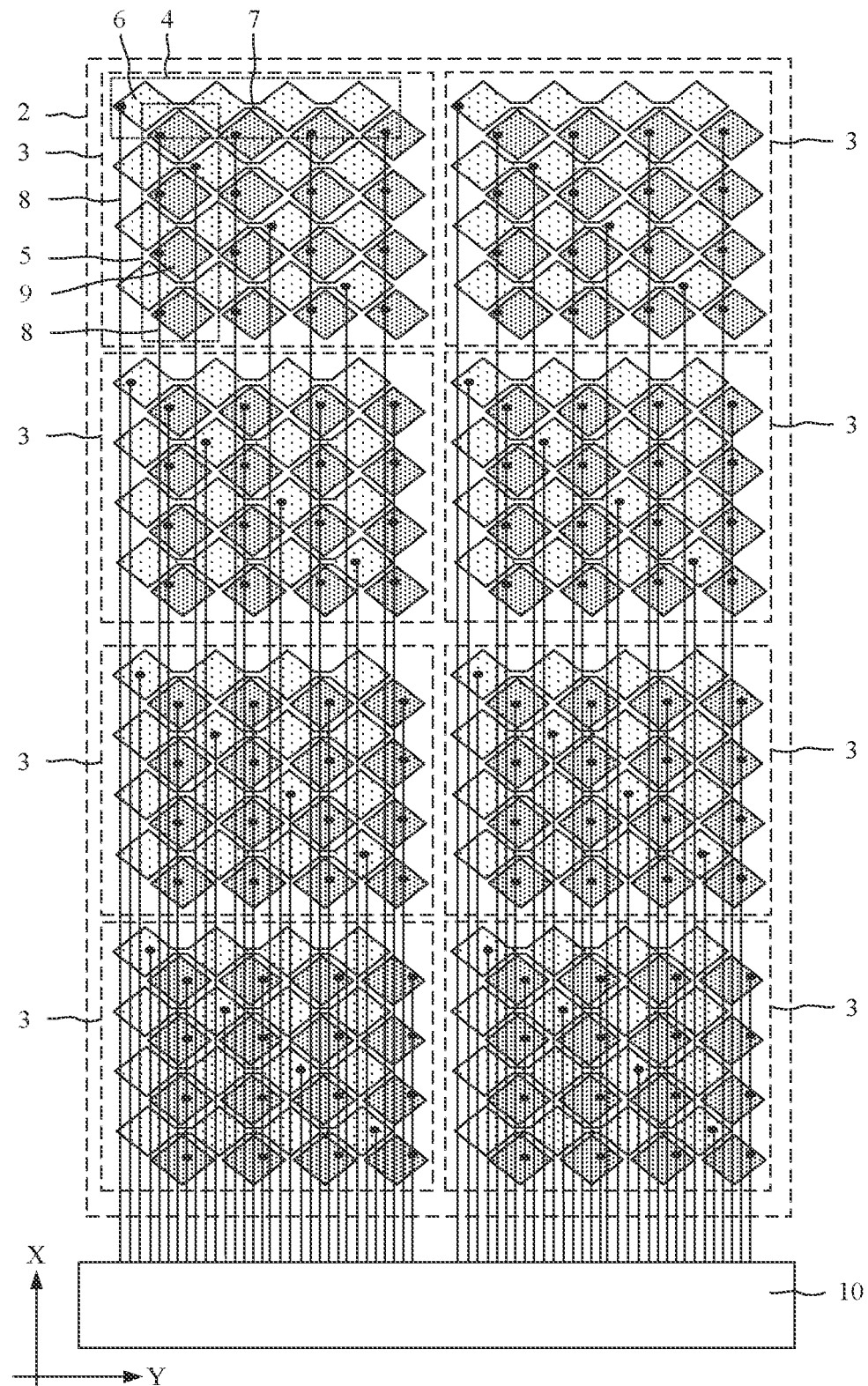
FIG. 5 is a schematic diagram of a connection between a touch structure in a single touch area and a touch driver chip according to an embodiment of the present invention.
Figure 6:
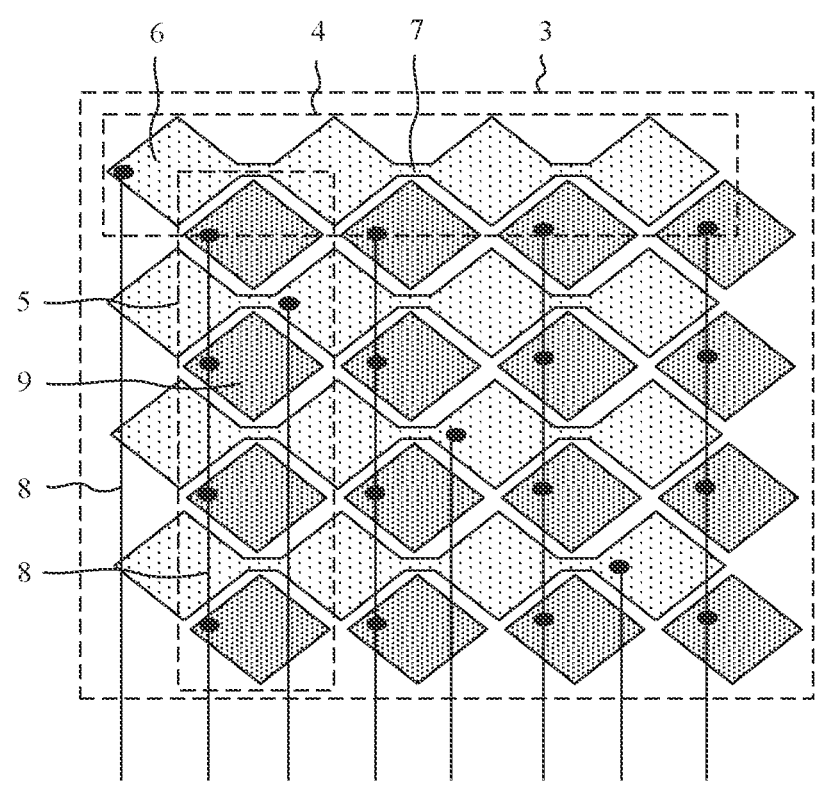
FIG. 6 is a schematic diagram of a structure of a single touch structure according to an embodiment of the present invention.

FIG. 4 is a schematic diagram of a structure of a touch display apparatus according to an embodiment of the present invention. FIG. 5 is a schematic diagram of a connection between a touch structure in a single touch area and a touch driver chip according to an embodiment of the present invention. FIG. 6 is a schematic diagram of a structure of a single touch structure according to an embodiment of the present invention. As shown in FIG. 4 to FIG. 6, the touch display apparatus includes a touch display panel 1, the touch display panel 1 includes at least one touch area 2. The touch area 2 includes a plurality of touch structures 3. The plurality of touch structures 3 may be arranged in a matrix manner. Each touch structure 3 includes a plurality of first touch electrodes 4 arranged along a first direction X and a plurality of second touch electrodes 5 arranged along a second direction Y. The first touch electrodes 4 and the second touch electrodes 5 are disposed at a same layer and are insulated. The first direction X intersects with the second direction Y. For example, the first direction X is a row direction, and the second direction Y is a column direction; or the first direction X is a column direction, and the second direction Y is a row direction. FIG. 4 and FIG. 5 are examples in which the first direction X is a column direction and the second direction Y is a row direction. The row direction in this embodiment of the present invention is a horizontal gate driver on array (GOA) circuit direction.

With reference to FIG. 5 and FIG. 6, the first touch electrode 4 includes a plurality of first electrode blocks 6 arranged along the second direction Y. Two adjacent first electrode blocks 6 are connected through a connection part 7, and one first touch electrode 4 is electrically connected to one touch signal line 8. The second touch electrode 5 includes a plurality of second electrode blocks 9 arranged along the first direction X. The plurality of second electrode blocks 9 in one second touch electrode 5 are electrically connected to one touch signal line 8, and the first touch electrode 4 and the second touch electrode 5 are electrically connected to different touch signal lines 8. In other words, the first electrode block 6 and the connection part 7 in the first touch electrode 4 are connected to each other. The first touch electrode 4 is of one electrode strip structure, and the second touch electrode 5 includes a plurality of separate second electrode blocks 9.

It should be noted that, in an example in which the first direction X is a column direction and the second direction Y is a row direction, in a same touch structure 3, the first touch electrodes 4 are arranged in odd rows, the plurality of second touch electrodes 5 are arranged in even rows with it second electrode blocks 9 located in a same row, and the first electrode blocks 6 and the second electrode blocks 9 are arranged in a staggered manner in the column direction. Alternatively, the first touch electrodes 4 are arranged in even rows, the plurality of second touch electrodes 5 are arranged in odd rows with $i^{th}$ second electrode blocks 9 located in a same row, the first electrode blocks 6 and the second electrode blocks 9 are arranged in a staggered manner in the column direction, and i is a positive integer greater than or equal to 1.

The touch display panel 1 further includes at least one touch driver chip 10, and one touch driver chip 10 is electrically connected to a touch signal line 8 that is connected to a touch structure 3 in one touch area 2. In other words, at least one touch driver chip 10 is in a one-to-one correspondence with at least one touch area 2. In one touch area 2, a plurality of touch signal lines 8 electrically connected to a plurality of touch structures 3 are all electrically connected to a same touch driver chip 10.

In this embodiment of the present invention, the touch electrode and the common electrode may be multiplexed, and the first touch electrode 4 and the second touch electrode 5 are formed by patterning the common electrode covered on an entire surface. In this case, time of one frame includes a display time period and a touch time period. In the display time period, a common voltage signal is transmitted between the first touch electrode 4 and the second touch electrode 5, and an electric field is formed between the first touch electrode 4 and the second touch electrode 5 and a pixel electrode of a sub-pixel, to drive normal rotation of liquid crystal molecules. In the touch time period, a touch detection signal is transmitted between the first touch electrode 4 and the second touch electrode 5, to detect a touch position of a finger.

In addition, the touch structure 3 may be a self-capacitance touch structure 3, or may be a mutual-capacitance touch structure 3. When the touch structure 3 is the self-capacitance touch structure 3, and is touched by a finger, a human body capacitance acts on the touch structure 3, and a capacitance of a self-capacitance of the first touch electrode 4 and the second touch electrode 5 at the touch position changes, so that touch point coordinates are determined based on a touch detection signal that is fed back through a touch signal line 8 connected to the first touch electrode 4 and the second touch electrode 5. When a touch mode is that the touch structure 3 is the mutual-capacitance touch structure 3, the first electrode block 6 and the second electrode block 9 that are adjacent to each other form a mutual capacitance at a gap. When touched by a finger, a capacitance of the mutual capacitance at a touch position changes, so that the touch point coordinates are determined based on a touch detection signal that is fed back through the touch signal line 8 connected to the first touch electrode 4 and the second touch electrode 5.

In this embodiment of the present invention, area division is performed on the touch display panel 1, and a plurality of independent touch structures 3 are disposed in each touch area 2 obtained through the division, so that touch detection precision of the touch display apparatus can be improved, and in particular, touch detection precision of a large-sized touch display apparatus under multi-finger touch can be improved. Specifically, if one matrix touch structure is disposed in an entire touch display panel, when multi-finger touch is performed, touch point coordinates are easily misjudged. As a result, a position that is not touched is also triggered, and a "ghost" phenomenon occurs. Based on the foregoing setting, each touch area 2 includes a plurality of independent touch structures 3, and the touch driver chip 10 may separately detect a touch status in a detection area in which each touch structure 3 is located. When multi-finger touch is performed, because an area of the detection area corresponding to each touch structure 3 is small, a plurality of fingers are more likely to be placed in detection areas in which different touch structures 3 are located, so that the touch driver chip 10 can more accurately learn of touch point coordinates of different finger touch positions when separately performing determining in each detection area, and a risk of misjudgment is reduced.

In addition, in this embodiment of the present invention, a plurality of first electrode blocks 6 belonging to a same first touch electrode 4 are electrically connected to a same touch signal line 8, and a plurality of second electrode blocks 9 belonging to a same second touch electrode 5 are also electrically connected to a same touch electrode line. Compared with a setting manner in the current technology in which each electrode block is connected to one touch signal line, when a quantity of electrode blocks is fixed, a quantity of touch signal lines 8 connected to the electrode blocks is reduced, in other words, a quantity of touch channels is reduced. In this case, a quantity of analog front end (AFE) devices and touch driver chips 10 that are configured to process a touch signal in the touch display apparatus may be correspondingly reduced. Especially for a large-sized touch display apparatus, a quantity of touch signal channels and a quantity of touch driver chips 10 can be reduced to a greater extent, and a cost requirement and an architecture of the touch display apparatus are both effectively simplified. In other words, when a quantity of touch channels is fixed, in this embodiment of the present invention, an area of the electrode block can be further reduced, to dispose more touch structures 3. In this way, touch detection precision is further improved.

In addition, by reducing a quantity of touch signal lines 8 and a quantity of touch driver chips 10, space that needs to be occupied by the touch signal lines 8 and the touch driver chips 10 in a frame of the touch display panel 1 is further reduced. This is more conducive to implementing a narrow frame design of the touch display apparatus. For example, in an existing large-sized touch display apparatus, there are a large quantity of touch driver chips. Therefore, the touch driver chips need to be bound respectively to frames on four sides of the touch display panel, and the frames on the four sides are wide. However, in this embodiment of the present invention, the quantity of touch driver chips 10 is greatly reduced. Therefore, the touch driver chip 10 needs to be bound only to a border area of the touch display panel 1, so that the touch display apparatus implements a design in which the three-side frames are ultra-narrow and the lower-side frame is narrow.

Moreover, based on the foregoing structure, the touch driver chip 10 only needs to simultaneously receive touch detection signals that are fed back through touch signal lines 8 connected to the touch driver chip 10, to detect a touch status in a touch area 2. Time-sharing detection does not need to be performed, and detection duration is shorter. In addition, compared with a structure in which touch switches are disposed in the current technology, time loss caused by switching between touch switches during time-sharing detection can also be avoided. When a touch electrode and a common electrode are multiplexed, refresh rates of touch and display are effectively improved, and touch and display effects are better.

In addition, it should be further noted that, in this embodiment of the present invention. Electrode blocks of both the first touch electrode 4 and the second touch electrode 5 do not need to be electrically connected through a bridge. Therefore, in this embodiment of the present invention, only a pattern design of a common electrode needs to be adjusted, so that the common electrode is cut into a plurality of independent first touch electrodes 4 and second touch electrodes 5, and process flows of forming a bridge and a corresponding mask do not need to be added. Therefore, design costs of the panel are not increased, design complexity of the panel is not increased, and an application scope is effectively improved.

In an implementation, refer to FIG. 4 again. The touch display panel includes a plurality of touch areas 2, and a plurality of touch areas 2 are arranged along a second direction Y. In this case, the touch display panel 1 is divided into the plurality of touch areas 2 arranged along the second direction Y. Based on this area division manner, a touch signal line 8 connected to a touch structure 3 in each touch area 2 can be connected to the touch driver chip 10 only by further extending to a border area along a first direction X. The touch signal line 8 has a shorter extension length and simpler cabling, to reduce an attenuation degree of a touch detection signal and a common voltage signal w % ben transmitted on the touch signal line 8, and further improve touch detection precision and a display effect.

Figure 7:
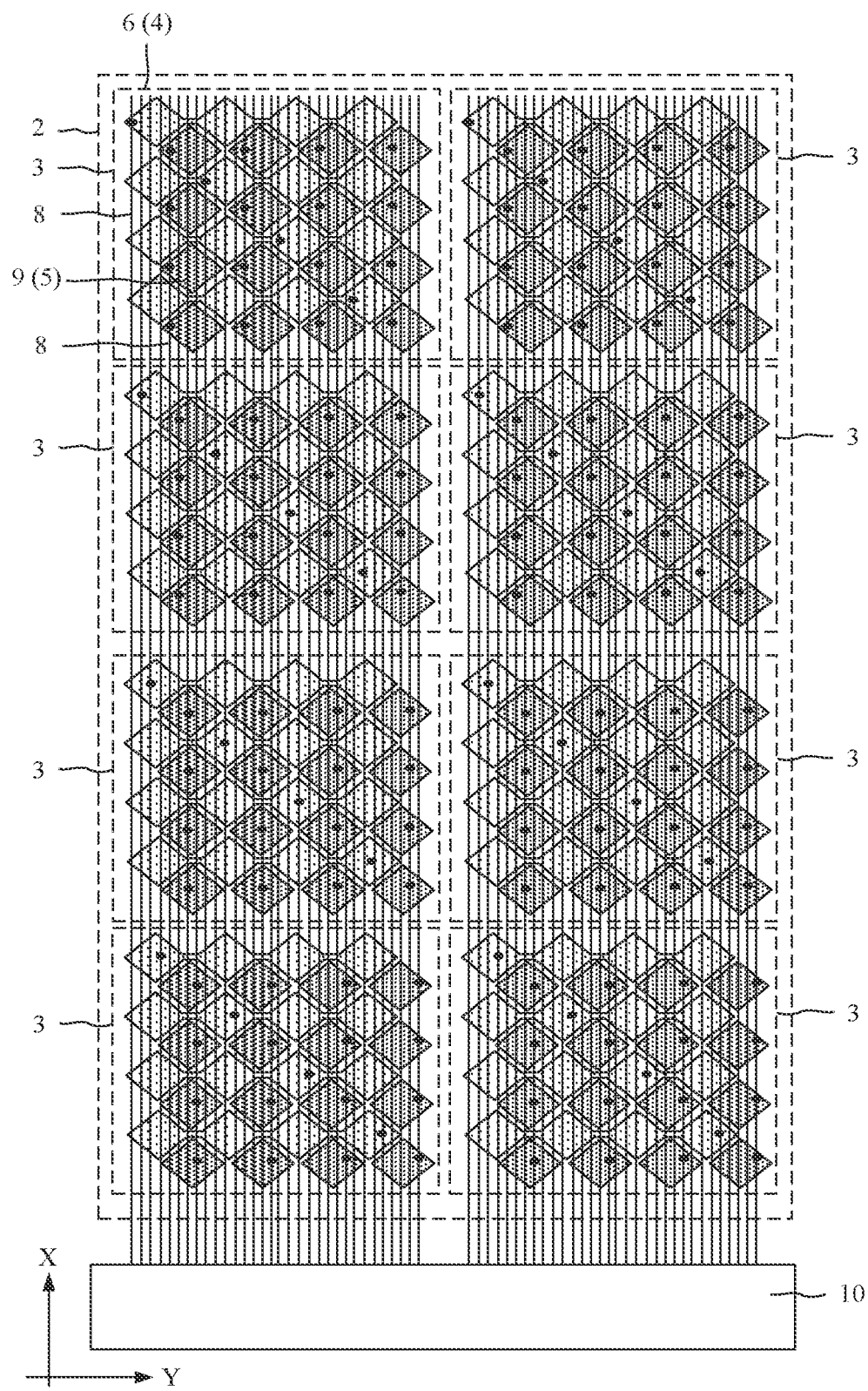
FIG. 7 is a schematic diagram of another structure of a touch signal line according to an embodiment of the present invention.

Further. FIG. 7 is a schematic diagram of another structure of a touch signal line according to an embodiment of the present invention. As shown in FIG. 7, an orthographic projection of a touch signal line 8 on a plane on which a touch display panel 1 is located runs through an orthographic projection of a plurality of first touch electrodes 4 that are arranged along a first direction X on the touch display panel 1 on the plane on which the touch display panel 1 is located.

In the foregoing disposing manner, regardless of whether a touch signal line 8 is connected to a first touch electrode 4 or a second touch electrode 5 on a side far away from the touch driver chip 10, or connected to a first touch electrode 4 or a second touch electrode 5 on a side close to the touch driver chip 10, the touch signal line 8 extends from the top of the touch area 2 away from the touch driver chip 10 to a position of the touch driver chip 10. In this case, extension lengths of a plurality of touch signal lines 8 tend to be consistent. This effectively improves load uniformity of the touch signal lines 8. In this way, consistency of voltage drops of touch detection signals or common voltage signals transmitted on different touch signal lines 8 is improved.

Figure 8:
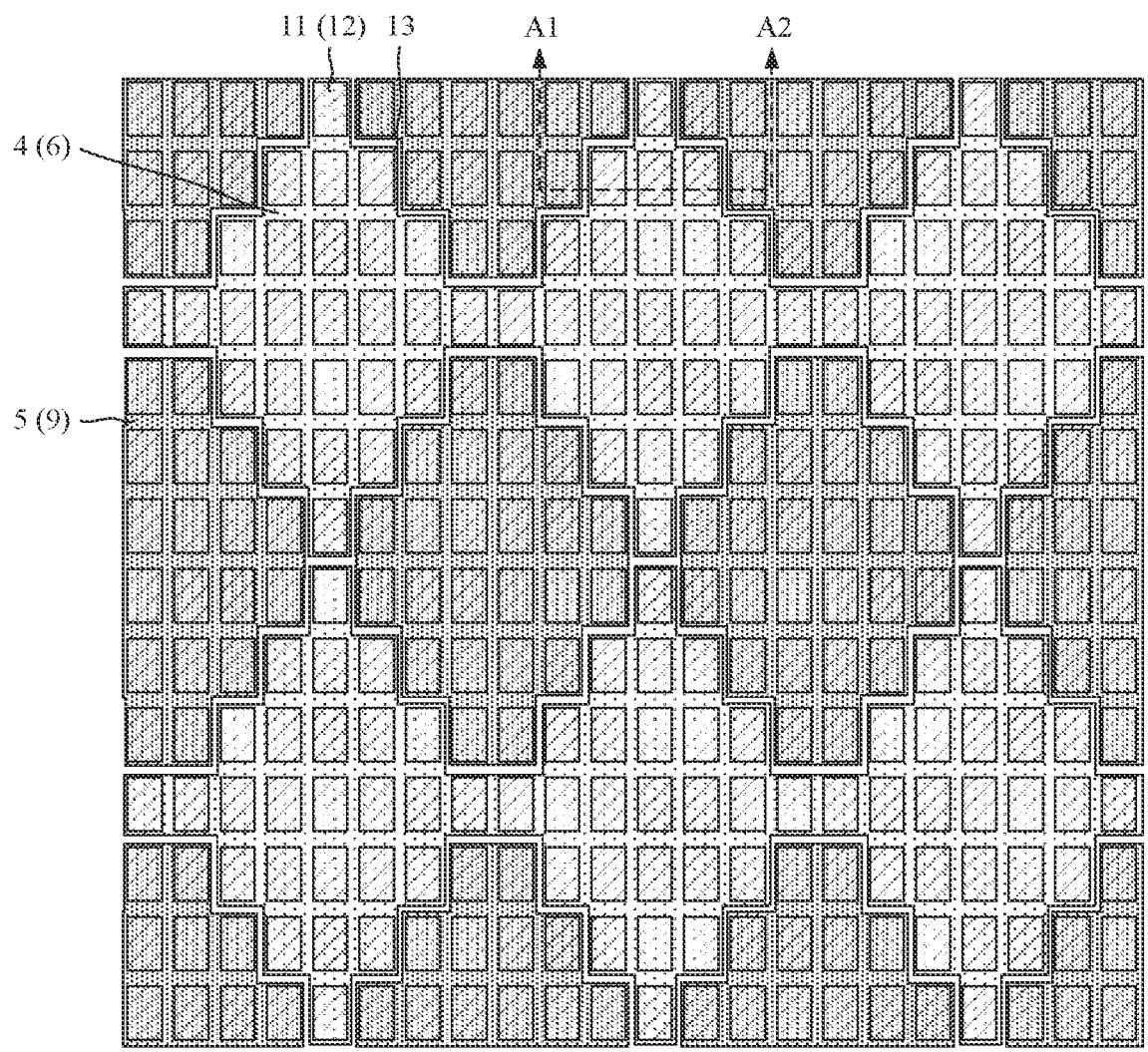
FIG. 8 is a schematic diagram of another structure of a touch structure according to an embodiment of the present invention.
Figure 9:
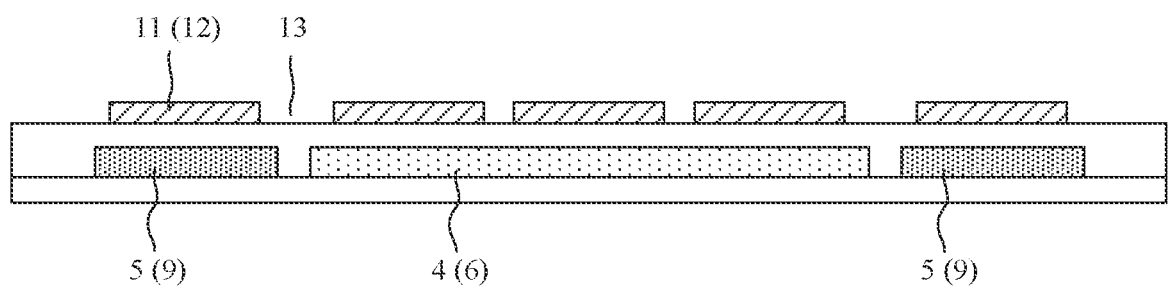
FIG. 9 is a sectional view of FIG. 8 along a direction of A1-A2.

In an implementation. FIG. 8 is a schematic diagram of another structure of a touch structure according to an embodiment of the present invention. FIG. 9 is a sectional view of FIG. 8 along a direction of A1-A2. As shown in FIG. 8 and FIG. 9, a first touch electrode 4 and a second touch electrode 5 are multiplexed as common electrodes. The touch display panel 1 further includes a sub-pixel 11, for example, a red sub-pixel used to transmit red light, a green sub-pixel used to transmit green light, and a blue sub-pixel used to transmit blue light. Each sub-pixel 11 includes a pixel electrode 12, and an orthographic projection of each pixel electrode 12 on the plane on which the touch display panel 1 is located is located in an orthographic projection of the first touch electrode 4 or the second touch electrode 5 on the plane on which the touch display panel 1 is located. It should be noted that, that a shape of the pixel electrode 12 shown in FIG. 8 is a rectangle is merely an example for description. In another optional embodiment of the present invention, the pixel electrode 12 may alternatively be of a comb structure.

When the first touch electrode 4 and the second touch electrode 5 are multiplexed as common electrodes, time of one frame includes a touch time period and a display time period. In the touch time period, touch detection signals are transmitted on the first touch electrode 4 and the second touch electrode 5, and the first touch electrode 4 and the second touch electrode 5 are used for touch detection. In the display time period, the first touch electrode 4 and the second touch electrode 5 are used as the common electrodes, and the first touch electrode 4 and the second touch electrode 5 transmit common voltage signals. An electric field is formed between the pixel electrode 12 of each sub-pixel 11 and the first touch electrode 4 or the second touch electrode 5 that overlaps the pixel electrode 12, and liquid crystal molecules rotate under an action of the electric field, to implement image display.

An orthographic projection of a pixel electrode 12 of each sub-pixel 11 is located in the orthographic projection of the first touch electrode 4 or the second touch electrode 5, so that a case in which some pixel electrodes 12 do not overlap the touch electrode, or a part of a touch electrode overlaps the touch electrode, a remaining part does not overlap the touch electrode may be avoided. In this way, the pixel electrode 12 of each sub-pixel 11 is ensured to completely overlap a common electrode corresponding to the pixel electrode 12. In this way, an electric field with equal strength is ensured to be formed between the pixel electrode 12 of each sub-pixel 11 and the common electrode, accuracy of a rotation angle of liquid crystal molecules is improved, and display effect is improved.

Further, refer to FIG. 8 and FIG. 9 again. There is a gap 13 between orthographic projections of any two adjacent pixel electrodes 12 on the plane on which the touch display panel 1 is located, and edges of orthographic projections of the first touch electrode 4 and the second touch electrode 5 on the plane on which the touch display panel 1 is located are located in the gap 13, so that on a premise that the orthographic projection of the touch electrode is ensured to completely cover the orthographic projection of each pixel electrode 12, a gap is also reserved between an edge of the orthographic projection of the touch electrode and an edge of the orthographic projection of the pixel electrode 12. Even if a location of the touch electrode or the pixel electrode 12 is slightly deviated due to a factor, for example, a process error, the orthographic projection of the touch electrode can still cover the orthographic projection of the pixel electrode 12, so that reliability of a relative location relationship between the pixel electrode 12 and the touch electrode is improved.

It should be noted that when the orthographic projection of each pixel electrode 12 on the plane on which the touch display panel 1 is located is located in the orthographic projection of the first touch electrode 4 or the second touch electrode 5 on the plane on which the touch display panel 1 is located, a pattern design of the first touch electrode 4 and the second touch electrode 5 may be adaptively adjusted based on an arrangement manner of the sub-pixels 11. For example, when pixel electrodes 12 in the sub-pixel 11 are arranged in a matrix manner, the first electrode blocks 6 in the first touch electrode 4 and the second electrode blocks 9 in the second touch electrode 5 may be of an approximate diamond structure, and edges of the first electrode block 6 and the second electrode block 9 are sawtooth edges, to ensure that orthographic projections of the first electrode block 6 and the second electrode block 9 completely cover the orthographic projection of the pixel electrode 12. Alternatively, in another optional embodiment of the present invention, shapes of the first electrode block 6 and the second electrode block 9 may alternatively be squares, triangles, or the like.

In an implementation, patterns of the plurality of first electrode blocks 6 after translation coincide, and patterns of the plurality of second electrode blocks 9 after translation coincide. In other words, the first electrode blocks 6 included in the first touch electrode 4 have a same shape and area, and the second electrode blocks 9 included in the second touch electrode 5 also have a same shape and area. In this way, arrangement of touch electrodes in the entire panel is more regular. During touch detection, it is easier to convert locations of the first touch electrode 4 and the second touch electrode 5 in the panel into touch point coordinates, operation complexity is lower, and an operation result of the touch point coordinates is more accurate.

Figure 10:
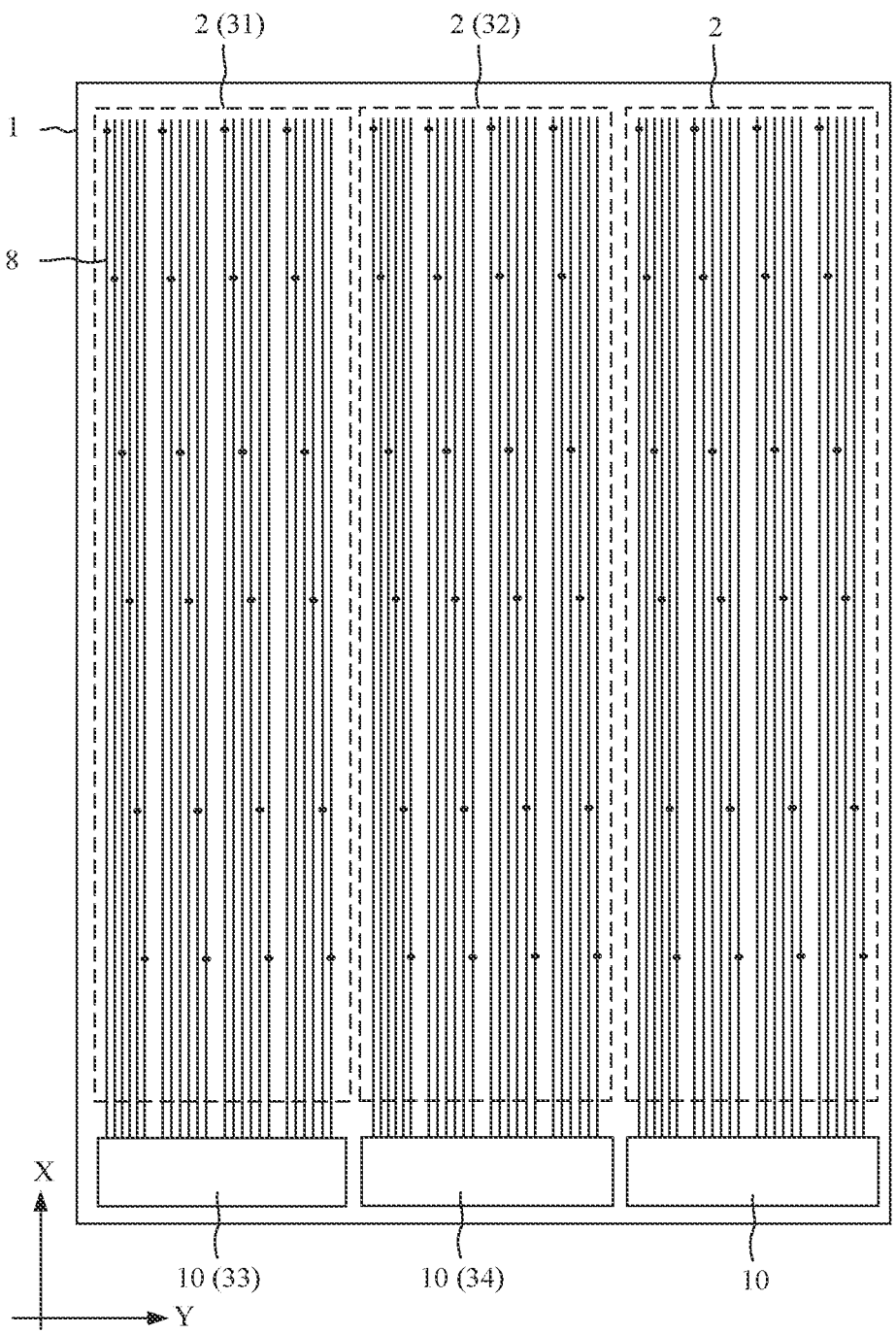
FIG. 10 is a schematic diagram of another structure of a touch display apparatus according to an embodiment of this application.
Figure 11:
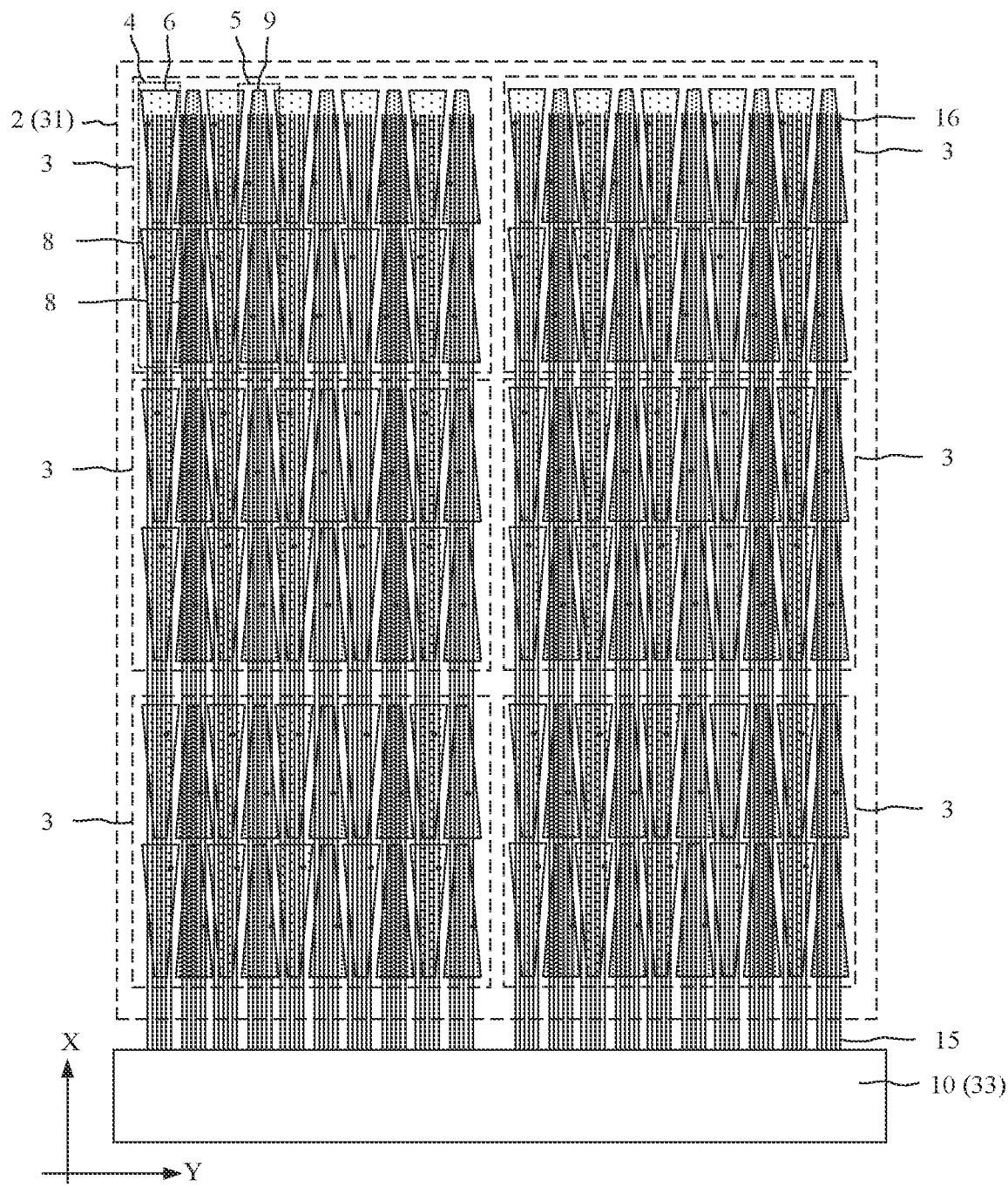
FIG. 11 is a schematic diagram of another connection between a touch structure in a single touch area and a touch driver chip according to an embodiment of this application.

An embodiment of this application further provides another touch display apparatus. FIG. 10 is a schematic diagram of another structure of a touch display apparatus according to an embodiment of this application. FIG. 11 is a schematic diagram of another connection between a touch structure in a single touch area and a touch driver chip according to an embodiment of this application. As shown in FIG. 10 and FIG. 11, the touch display apparatus includes a touch display panel 1, the touch display panel 1 includes a plurality of touch areas 2, and the touch area 2 includes a first touch area 31 and a second touch area 32. The first touch area 31 and the second touch area 32 respectively include a plurality of touch structures 3, and the plurality of touch structures 3 in the first touch area 31 and the second touch area 32 may be arranged in a matrix manner.

The touch display panel 1 further includes a plurality of touch driver chips 10. The touch driver chip 10 includes a first touch chip 33 and a second touch chip 34. The first touch chip 33 is electrically connected to a touch signal line 8 that is connected to the touch structure 3 in the first touch area 31, and the second touch chip 34 is electrically connected to a touch signal line 8 that is connected to the touch structure 3 in the second touch area 32.

In this embodiment of this application, area division is performed on the touch display panel 1, and a plurality of independent touch structures 3 are disposed in each touch area 2 obtained through the division, so that touch detection precision of the touch display apparatus can be improved, and in particular, touch detection precision of a large-sized touch display apparatus under multi-finger touch can be improved. Specifically, if one touch structure is disposed in an entire touch display panel, when multi-finger touch is performed, for example, when 10-finger touch is performed in a two-person operation, touch point coordinates are easily misjudged. As a result, a position that is not touched is also triggered, and a "ghost" phenomenon occurs. Based on the foregoing setting, each touch area 2 includes a plurality of independent touch structures 3, and the touch driver chip 10 may separately detect a touch status in a detection area in which each touch structure 3 is located. When multi-finger touch is performed, because an area of the detection area corresponding to each touch structure 3 is small, a plurality of fingers are more likely to be placed in detection areas in which different touch structures 3 are located, so that the touch driver chip 10 can more accurately learn of touch point coordinates of different finger touch positions when separately performing determining in each detection area, and a risk of misjudgment is reduced.

In addition, based on the foregoing structure, a single touch driver chip 10 only needs to simultaneously receive touch detection signals that are fed back through touch signal lines 8 connected to the touch driver chip, to detect a touch status in a touch area 2, and a plurality of touch driver chips 10 may alternatively simultaneously perform touch detection. Therefore, in this embodiment of this application, time-sharing detection does not need to be performed, and detection duration is shorter. In addition, compared with a structure in which touch switches are disposed in the current technology, the touch driver chip 10 is connected to the touch signal line 8, so that a time loss caused by switching between the touch switches can be avoided, and a problem of low working reliability of a circuit caused by an on-resistance can be avoided. In addition, when the touch electrode and the common electrode in the touch structure 3 are multiplexed, in this embodiment of this application, refresh rates of touch and display can be further effectively improved, and touch and display effects are better.

In an implementation, refer to FIG. 10 again. A plurality of touch areas 2 are arranged in a same direction, and an arrangement direction of the touch areas 2 intersects an extension direction of the touch signal line 8. In an example in which the touch signal line 8 shown in FIG. 10 extends along a first direction X and the plurality of touch areas 2 extend along a second direction Y, based on this area division manner, the touch signal line 8 connected to the touch structure 3 in each touch area 2 can be connected to the touch driver chip 10 only by further extending to a lower-level area along the first direction X. The touch signal line 8 has a shorter extension length and simpler cabling, to reduce an attenuation degree of a touch detection signal and a common voltage signal when transmitted on the touch signal line 8, and further improve touch detection precision and a display effect.

In an implementation of this application, refer to FIG. 6. The touch structure 3 includes a plurality of first touch electrodes 4 and a plurality of second touch electrodes 5. The plurality of first touch electrodes 4 are arranged along the first direction X. The plurality of second touch electrodes 5 are arranged along the second direction Y. The first touch electrode 4 and the second touch electrode 5 are disposed at a same layer and are insulated, and the first direction X intersects the second direction Y. The first touch electrode 4 includes a plurality of first electrode blocks 6 arranged along the second direction Y. Two adjacent first electrode blocks 6 are connected through a connection part 7, and one first touch electrode 4 is electrically connected to one touch signal line 8. The second touch electrode 5 includes a plurality of second electrode blocks 9 arranged along the first direction X. The plurality of second electrode blocks 9 in one second touch electrode 5 are electrically connected to one touch signal line 8. In other words, the first electrode block 6 and the connection part 7 in the first touch electrode 4 are connected to each other. The first touch electrode 4 is of one electrode strip structure, and the second touch electrode 5 includes a plurality of separate second electrode blocks 9. It may be understood that the first touch electrode 4 and the second touch electrode 5 are electrically connected to different touch signal lines 8.

In the foregoing structure, a plurality of first electrode blocks 6 belonging to a same first touch electrode 4 are electrically connected to a same touch signal line 8, and a plurality of second electrode blocks 9 belonging to a same second touch electrode 5 are also electrically connected to a same touch electrode line. When a quantity of electrode blocks is fixed, a quantity of touch signal lines 8 connected to the electrode blocks is reduced, in other words, a quantity of touch channels is reduced. In this case, a quantity of analog front end (AFE) devices and touch driver chips 10 that are configured to process a touch signal in the touch display apparatus may be correspondingly reduced. Especially for a large-sized touch display apparatus, a quantity of touch signal channels and a quantity of touch driver chips 10 can be reduced to a greater extent, and a cost requirement and an architecture of the touch display apparatus are both effectively simplified. In other words, w % ben a quantity of touch channels is fixed, in this embodiment of this application, an area of the electrode block can be further reduced, to dispose more touch structures 3. In this way, touch detection precision is further improved. In addition, compared with the existing structure shown in FIG. 3, a hollow area does not need to be disposed in the electrode block of the foregoing structure. Therefore, a problem of poor touch caused by a touch pitch between a common electrode and a touch electrode in the hollow area can be avoided.

In addition, by reducing a quantity of touch signal lines 8 and a quantity of touch driver chips 10, space that needs to be occupied by the touch signal lines 8 and the touch driver chips 10 in a frame of the touch display panel 1 is further reduced. This is more conducive to implementing a narrow frame design of the touch display apparatus.

In addition, in the foregoing structure, electrode blocks of both the first touch electrode 4 and the second touch electrode 5 do not need to be electrically connected through a bridge. Therefore, in this embodiment of this application, only a pattern design of a common electrode needs to be adjusted, so that the common electrode is cut into a plurality of independent first touch electrodes 4 and second touch electrodes 5, and process flows of forming a bridge and a corresponding mask do not need to be added. Therefore, design costs of the panel are not increased, design complexity of the panel is not increased, and an application scope is also effectively improved.

It should be noted that, in a case that the single touch structure 3 is considered as one M*N (where the touch structure 3 includes M first touch electrodes 4 and N second touch electrodes 5) matrix touch structure, if one large matrix touch structure is disposed in the entire panel, when multi-finger touch is performed, touch point coordinates are easily misjudged. As a result, a position that is not touched is also triggered. However, in this embodiment of this application, each touch area 2 includes a plurality of independent touch structures 3, and an area of a detection area corresponding to each touch structure 3 is small. Therefore, in the case of multi-finger touch, it is more likely that a plurality of fingers are placed in detection areas in which different touch structures 3 are located, and the touch driver chip 10 can accurately learn of touch point coordinates of different finger touch positions when performing separate judgment on each detection area, to reduce a risk of misjudgment.

Further, refer to FIG. 7. In a direction of a plane on which the touch display panel 1 is located, an orthographic projection of the touch signal line 8 runs through orthographic projections of the plurality of first touch electrodes 4 arranged along the first direction X on the touch display panel 1.

In the foregoing disposing manner, regardless of whether a touch signal line 8 is connected to a first touch electrode 4 or a second touch electrode 5 on a side far away from the touch driver chip 10, or connected to a first touch electrode 4 or a second touch electrode 5 on a side close to the touch driver chip 10, the touch signal line 8 extends from the top of the touch area 2 away from the touch driver chip 10 to a position of the touch driver chip 10. In this case, extension lengths of a plurality of touch signal lines 8 tend to be consistent. This effectively improves load uniformity of the touch signal lines 8. In this way, consistency of voltage drops of touch detection signals or common voltage signals transmitted on different touch signal lines 8 is improved.

Figure 12:
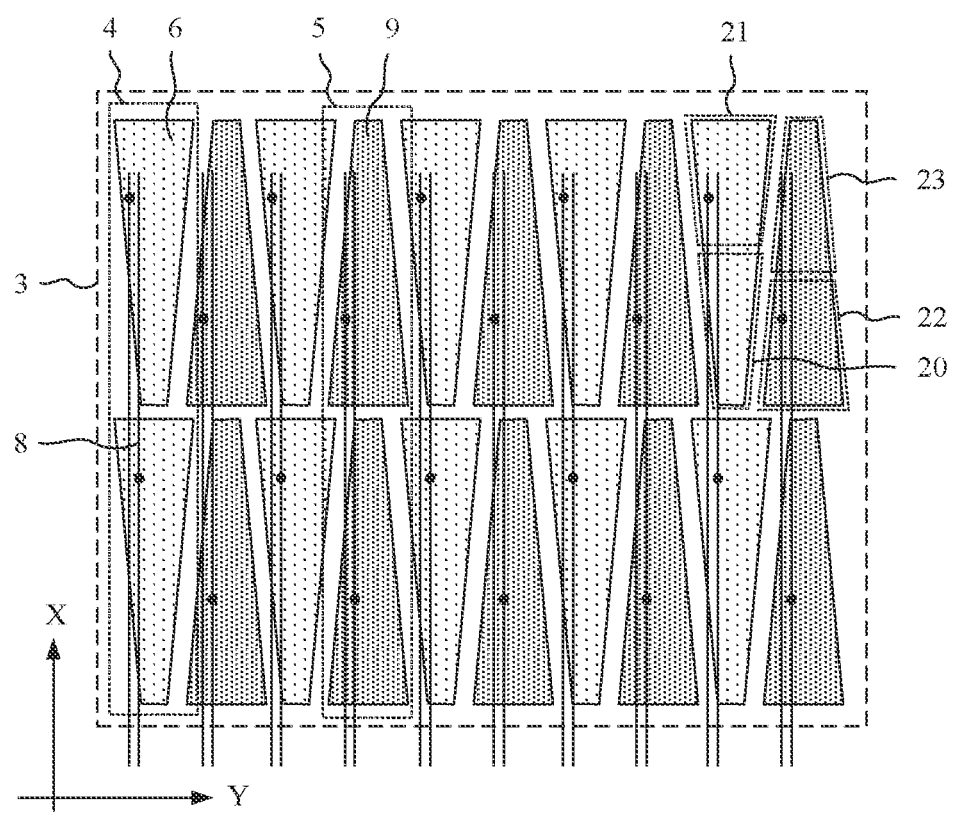
FIG. 12 is a schematic diagram of a structure of a touch structure corresponding to FIG. 11.
Figure 13:
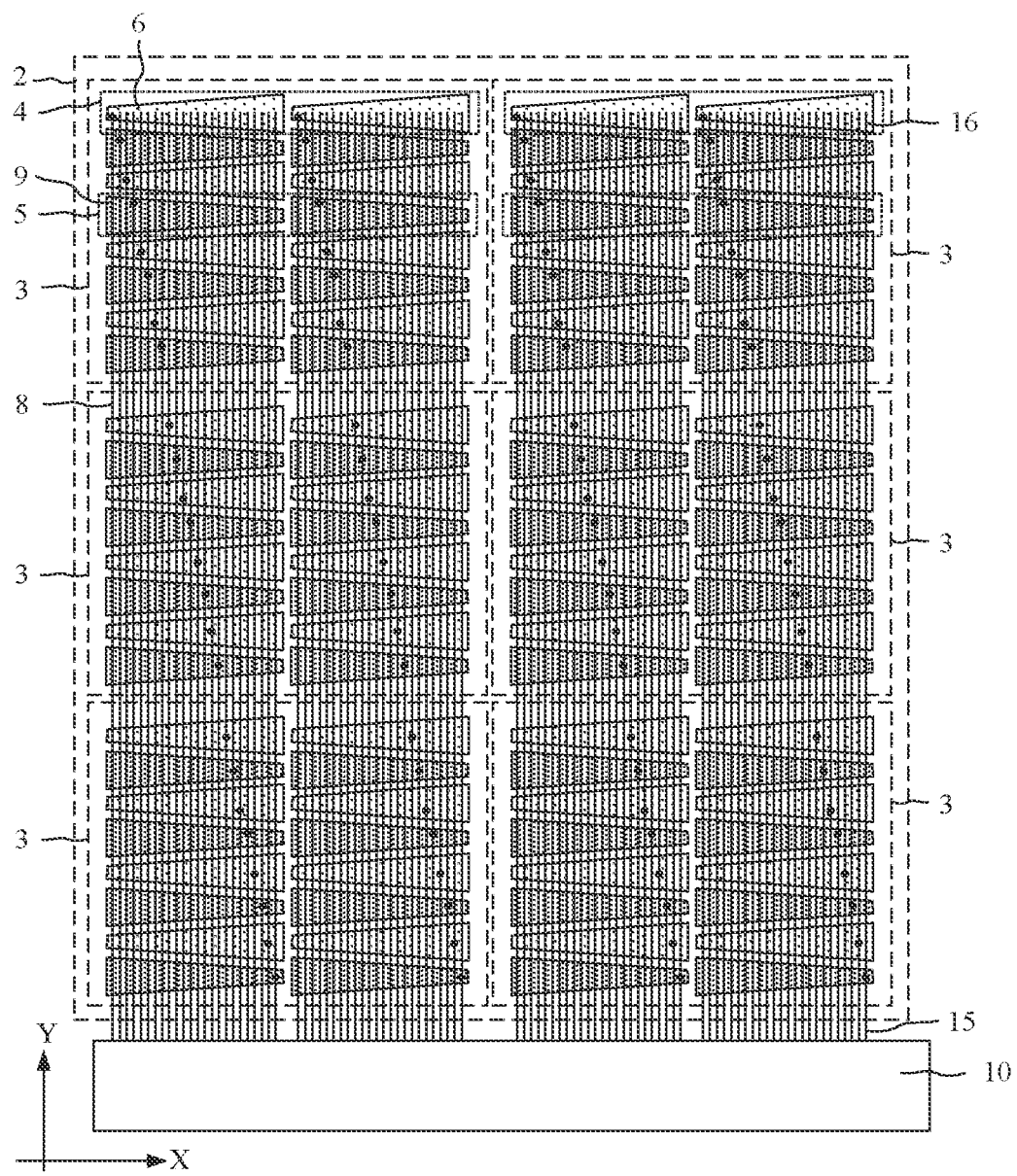
FIG. 13 is a schematic diagram of still another connection between a touch structure in a single touch area and a touch driver chip according to an embodiment of this application.
Figure 14:
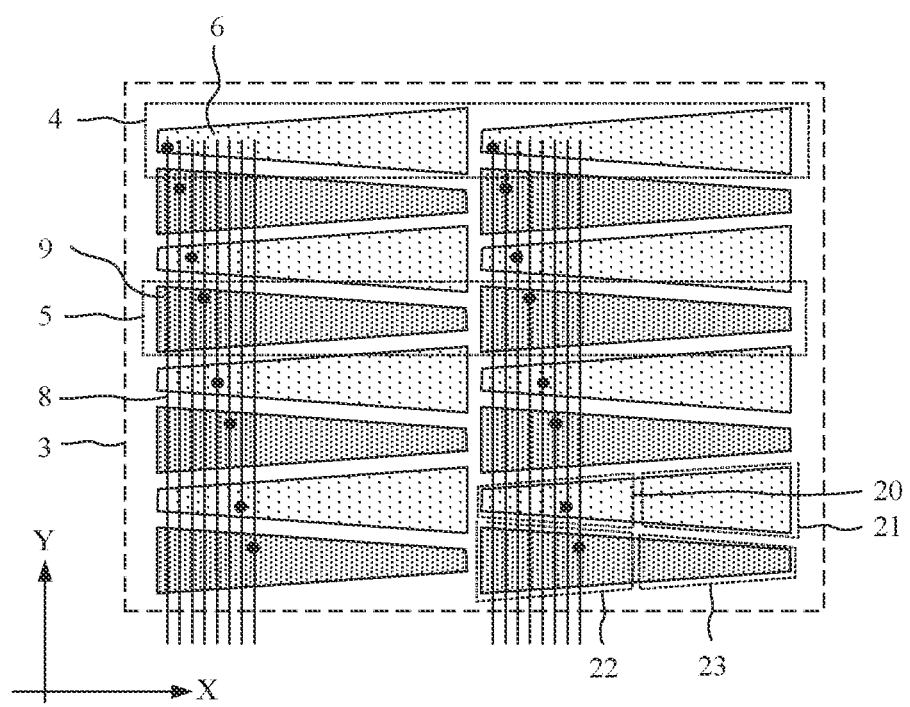
FIG. 14 is a schematic diagram of a structure of a touch structure corresponding to FIG. 13.

Alternatively, in another implementation, with reference to FIG. 11 and FIG. 12, FIG. 12 is a schematic diagram of a structure of a touch structure corresponding to FIG. 11. With reference to FIG. 13 and FIG. 14, FIG. 13 is a schematic diagram of still another connection between a touch structure in a single touch area and a touch driver chip according to an embodiment of this application, and FIG. 14 is a schematic diagram of a structure of a touch structure corresponding to FIG. 13. The touch structure 3 includes a plurality of first touch electrodes 4 and a plurality of second touch electrodes 5. The first touch electrodes 4 and the second touch electrodes 5 are alternately arranged in a second direction Y. The first touch electrode 4 includes first electrode blocks 6 arranged along a first direction X, and one first electrode block 6 is electrically connected to one touch signal line 8. The second touch electrode 5 includes second electrode blocks 9 arranged along the first direction X, one second electrode block 9 is electrically connected to one touch signal line 8, and the first direction X intersects with the second direction Y FIG. 11 and FIG. 12 are examples in which the first direction X is a column direction and the second direction Y is a row direction. FIG. 13 and FIG. 14 are examples in which the first direction X is a row direction and the second direction Y is a column direction.

The first electrode block 6 includes a first electrode part 20 and a second electrode part 21 that are arranged along the first direction X. A width of the first electrode part 20 in the second direction Y is less than a width of the second electrode part 21 in the second direction Y. The second electrode block 9 includes a third electrode part 22 and a fourth electrode part 23 that are arranged along the first direction X. and a width of the third electrode part 22 in the second direction Y is greater than a width of the fourth electrode part 23 in the second direction Y.

In this embodiment of this application, the touch structure 3 may be a self-capacitance touch structure or a mutual-capacitance touch structure. When the touch structure 3 is a self-capacitance touch structure, and is touched by a finger, a human body capacitance acts on the touch structure 3, and a capacitance of a self-capacitance of the first touch electrode 4 and the second touch electrode 5 at the touch position changes, so that touch point coordinates are determined based on a touch detection signal that is fed back through a touch signal line 8 connected to the first touch electrode 4 and the second touch electrode 5. When a touch mode is that the touch structure is the mutual-capacitance touch structure, the first electrode block 6 and the second electrode block 9 that are adjacent to each other form a mutual capacitance at a gap. When touched by a finger, a capacitance of the mutual capacitance at a touch position changes, so that the touch point coordinates are determined based on a touch detection signal that is fed back through the touch signal line 8 connected to the first touch electrode 4 and the second touch electrode 5.

In the foregoing structure, widths of different positions of the first electrode block 6 are different, and widths of different positions of the second electrode block 9 are different. Therefore, when a finger touches different positions of the first electrode block 6 or the second electrode block 9 in the first direction X, capacitance change amounts of the first electrode block 6 or the second electrode block 9 are different. Especially in the self-capacitance touch, coordinate positions of the finger in the first direction X may be accurately determined based on capacitance change amounts of the first electrode block 6 or the second electrode block 9, to improve detection precision and reduce a risk of misjudgment. Therefore, on the premise that high touch precision is achieved, in this embodiment of this application, sizes of the first electrode block 6 and the second electrode block 9 in the first direction X may be increased, to reduce a quantity of electrode blocks that need to be disposed in the touch display apparatus, and correspondingly reduce a quantity of touch signal lines 8 connected to the electrode blocks.

It can be learned that the foregoing structure can effectively reduce a quantity of touch channels, and quantities of analog front end (AFE) devices and touch driver chips 10 that are configured to process a touch signal in the touch display apparatus can be correspondingly reduced. Especially for a large-sized touch display apparatus, a quantity of touch signal channels and a quantity of touch driver chips 10 can be reduced to a greater extent, and a cost requirement and an architecture of the touch display apparatus are both effectively simplified. In addition, compared with the existing structure shown in FIG. 3, a hollow area does not need to be disposed in the electrode block of the foregoing structure. Therefore, a problem of poor touch caused by a touch pitch between a common electrode and a touch electrode in the hollow area can be avoided.

In addition, by reducing a quantity of touch signal lines 8 and a quantity of touch driver chips 10, space that needs to be occupied by the touch signal lines 8 and the touch driver chips 10 in a frame of the touch display panel 1 is further reduced. This is more conducive to implementing a narrow frame design of the touch display apparatus.

Further, to improve detection precision of a coordinate position of a finger in the first direction X to a greater extent, refer to FIG. 12 and FIG. 14 again. Along the first direction X, a width of the first electrode block 6 in the second direction Y increases successively, and a width of the second electrode block 9 in the second direction Y decreases successively. In this case, the first electrode block 6 and the second electrode block 9 may be in a trapezoid or a triangle.

Further, refer to FIG. 11 and FIG. 13 again. A touch signal line includes a first end part 15 and a second end part 16. The first end part 15 is electrically connected to the touch driver chip 10, and second end parts 16 of the plurality of touch signal lines 8 are aligned.

In the foregoing disposing manner, regardless of whether the touch signal line 8 is connected to a first electrode block 6 or a second electrode block 9 on a side far away from the touch driver chip 10, or connected to a first touch electrode block 6 or a second electrode block 9 on a side close to the touch driver chip 10, the touch signal line 8 extends from the top of the touch area 2 away from the touch driver chip 10 to a position of the touch driver chip 10. In this case, extension lengths of a plurality of touch signal lines 8 tend to be consistent. This effectively improves load uniformity of the touch signal lines 8. In this way, consistency of voltage drops of touch detection signals or common voltage signals transmitted on different touch signal lines 8 is improved.

Figure 15:
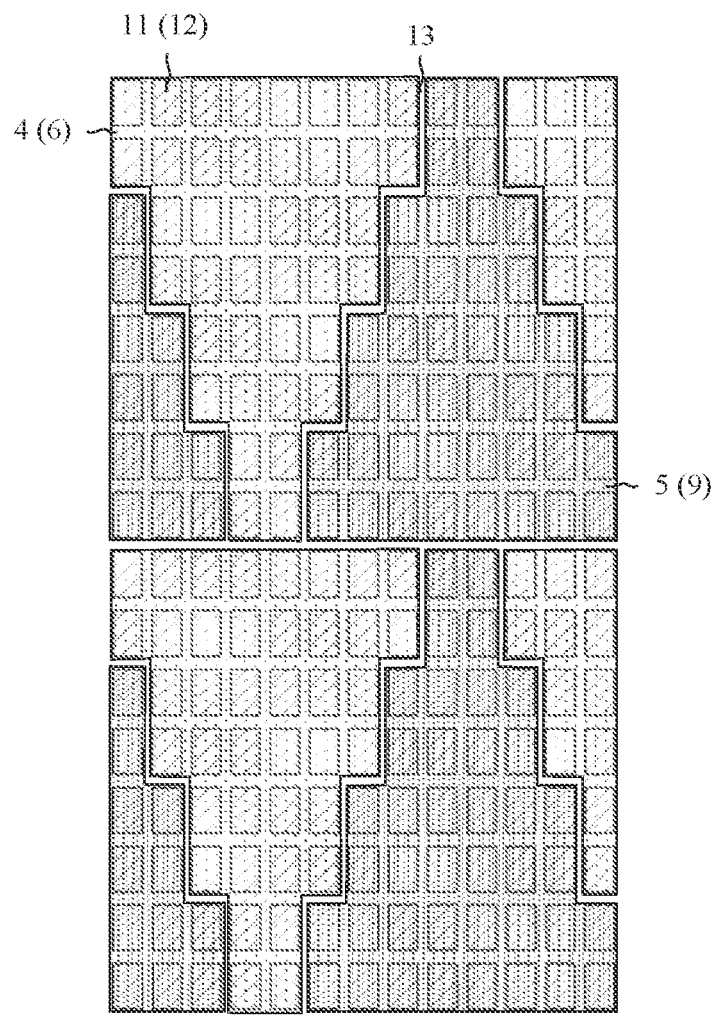
FIG. 15 is a schematic diagram of another structure of a touch structure corresponding to FIG. 11.

In an implementation, refer to FIG. 8, FIG. 9, and FIG. 15 again. FIG. 15 is a schematic diagram of another structure of a touch structure corresponding to FIG. 11. A first touch electrode 4 and a second touch electrode 5 are multiplexed as common electrodes. The touch display panel 1 further includes a sub-pixel 11, for example, a red sub-pixel used to transmit red light, a green sub-pixel used to transmit green light, and a blue sub-pixel used to transmit blue light. Each sub-pixel 11 includes a pixel electrode 12, and an orthographic projection of each pixel electrode 12 on a plane on which the touch display panel 1 is located is located in an orthographic projection of the first touch electrode 4 or the second touch electrode 5 on the plane on which the touch display panel 1 is located. It should be noted that, that a shape of the pixel electrode 12 shown in FIG. 12 and FIG. 14 is a rectangle is merely an example for description. In another optional embodiment of this application, the pixel electrode 12 may alternatively be of a comb structure.

When the first touch electrode 4 and the second touch electrode 5 are multiplexed as common electrodes, the first touch electrode 4 and the second touch electrode 5 may be formed by patterning the common electrode covered on an entire surface. In this case, time of one frame includes a touch time period and a display time period. In the touch time period, touch detection signals are transmitted on the first touch electrode 4 and the second touch electrode 5, and the first touch electrode 4 and the second touch electrode 5 are used for touch detection. In the display time period, the first touch electrode 4 and the second touch electrode 5 are used as the common electrodes, and the first touch electrode 4 and the second touch electrode 5 transmit common voltage signals. An electric field is formed between a pixel electrode 12 of each sub-pixel 11 and a first touch electrode 4 or a second touch electrode 5 that overlaps the pixel electrode 12, and liquid crystal molecules rotate under an action of the electric field, to implement image display.

An orthographic projection of the pixel electrode 12 of each sub-pixel 11 is located in the orthographic projection of the first touch electrode 4 or the second touch electrode 5, so that a case in which some pixel electrodes 12 do not overlap the touch electrode, or a part of a touch electrode overlaps the touch electrode, a remaining part does not overlap the touch electrode may be avoided. In this way, the pixel electrode 12 of each sub-pixel 11 is ensured to completely overlap a common electrode corresponding to the pixel electrode 12. In this way, an electric field with equal strength is ensured to be formed between the pixel electrode 12 of each sub-pixel 11 and the common electrode, accuracy of a rotation angle of liquid crystal molecules is improved, and display effect is improved.

Further, refer to FIG. 8, FIG. 9, and FIG. 15 again. There is a gap 13 between orthographic projections of any two adjacent pixel electrodes 12 on the plane on which the touch display panel 1 is located, and in a direction of the plane on which the touch display panel 1 is located, an edge of the orthographic projection of the first touch electrode 4 and an edge of the orthographic projection of the second touch electrode 5 are located in the gap 13, so that on a premise that an orthographic projection of a touch electrode is ensured to completely cover the orthographic projection of each pixel electrode 12, a gap is also reserved between an edge of the orthographic projection of the touch electrode and an edge of the orthographic projection of the pixel electrode 12. Even if a location of the touch electrode or the pixel electrode 12 is slightly deviated due to a factor, for example, a process error, the orthographic projection of the touch electrode can still cover the orthographic projection of the pixel electrode 12, so that reliability of a relative location relationship between the pixel electrode 12 and the touch electrode is improved.

It should be noted that when the orthographic projection of each pixel electrode 12 on the plane on which the touch display panel 1 is located is located in the orthographic projection of the first touch electrode 4 or the second touch electrode 5 on the plane on which the touch display panel 1 is located, a pattern design of the first touch electrode 4 and the second touch electrode 5 may be adaptively adjusted based on an arrangement manner of the sub-pixels 11.

In an implementation, patterns of the plurality of first electrode blocks 6 after translation coincide, and patterns of the plurality of second electrode blocks 9 after translation coincide. In other words, the first electrode blocks 6 included in the first touch electrode 4 have a same shape and area, and the second electrode blocks 9 included in the second touch electrode 5 also have a same shape and area. In this way, arrangement of touch electrodes in the entire panel is more regular. During touch detection, it is easier to convert locations of the first touch electrode 4 and the second touch electrode 5 in the panel into touch point coordinates, operation complexity is lower, and an operation result of the touch point coordinates is more accurate.

Figure 16:
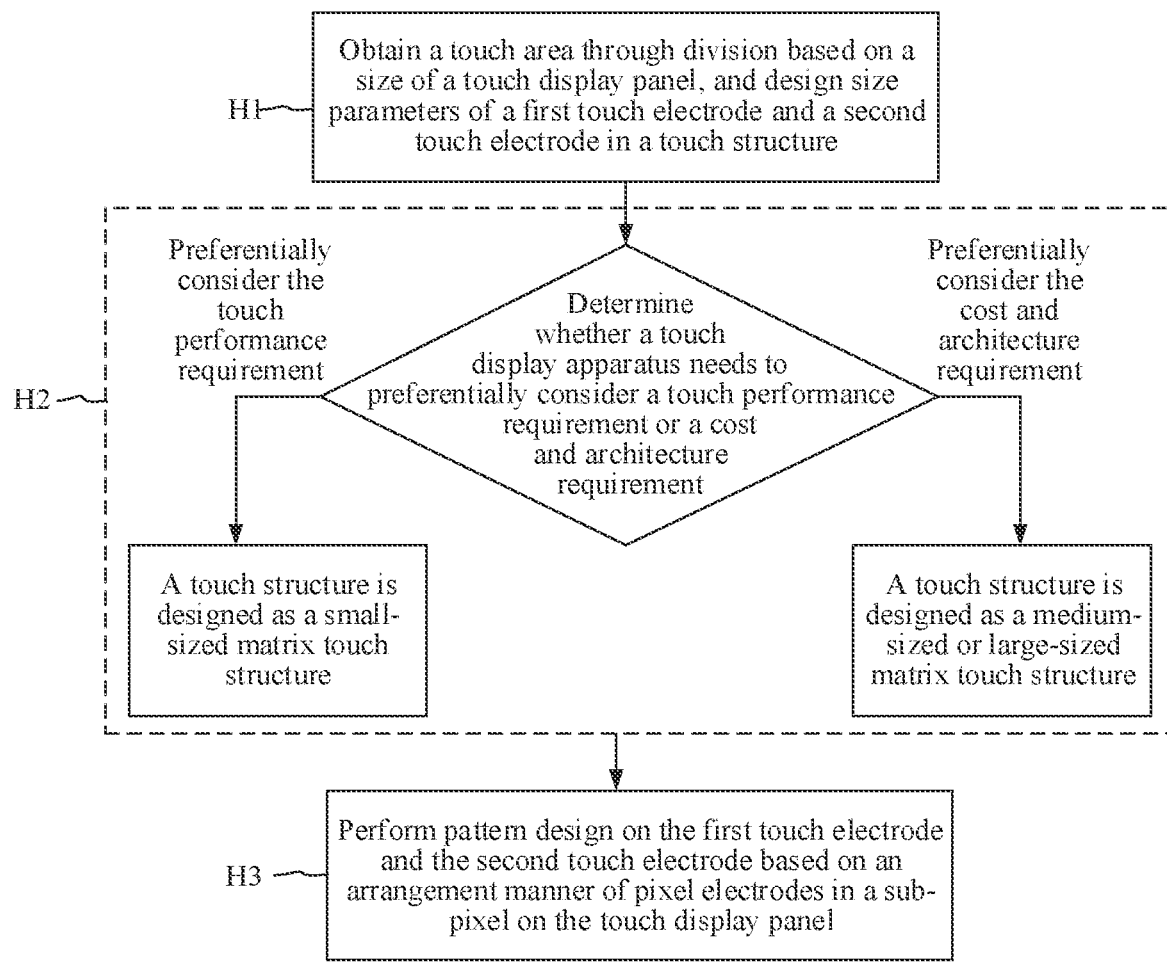
FIG. 16 is a flowchart of a design idea of a touch display apparatus according to an embodiment of the present invention.

Based on the specific structure of the touch display apparatus, FIG. 16 is a flowchart of a design idea of the touch display apparatus according to an embodiment of the present invention. As shown in FIG. 16, the design idea of the touch display apparatus in the embodiment of the present invention is as follows:

Step H1: Obtain a touch area 2 through division based on a size of a touch display panel 1, and design size parameters of a first touch electrode 4 and a second touch electrode 5 in a touch structure 3.

Specifically, a pitch between center points of two adjacent first electrode blocks 6 in the first touch electrode 4 and a pitch between center points of two adjacent second electrode blocks 9 in the second touch electrode 5 are designed based on size parameters such as a length and a width of the touch display panel 1.

Step H2: Determine whether the touch display apparatus needs to preferentially consider a touch performance requirement or a cost and architecture requirement, in a case that the touch performance requirement is preferentially considered, the touch structure 3 may be designed as a small-sized matrix touch structure 3, for example, may be designed as 4*4 (where the touch structure 3 includes four rows of first touch electrodes 4 and four columns of second touch electrodes 5), 3*3 (where the touch structure 3 includes three rows of first touch electrodes 4 and three columns of second touch electrodes 5), or 4*2 (where the touch structure 3 includes four rows of first touch electrodes 4 and two columns of second touch electrodes 5), and other matrix touch structures, to improve touch detection precision under multi-finger touch, in a case that the cost and architecture requirement is preferentially considered, the touch structure 3 may be designed as a medium-sized or large-sized matrix touch structure 3, for example, may be designed as 10*10 (where the touch structure 3 includes 10 rows of first touch electrodes 4 and 10 columns of second touch electrodes 5), 20*20 (where the touch structure 3 includes 20 rows of first touch electrodes 4 and 20 columns of second touch electrodes 5), and other matrix touch structures 3, to reduce a quantity of touch channels and a quantity of touch driver chips 10 to a larger extent on a premise of maximum load that can be matched by the driver chip.

Step H3: Perform pattern design on the first touch electrode 4 and the second touch electrode 5 based on an arrangement manner of pixel electrodes 12 in a sub-pixel 11 on the touch display panel 1.

Specifically, when the pixel electrodes 12 in the sub-pixel 11 are arranged in a matrix manner, the first electrode block 6 and the second electrode block 9 may be designed as approximate diamond structures with sawtooth edges, to ensure that all orthographic projections of the pixel electrodes 12 on a plane on which the touch display panel 1 is located are located in orthographic projections of the first touch electrode 4 and the second touch electrode 5 on the plane on which the touch display panel 1 is located. In addition, all the first electrode blocks 6 may be further designed as electrode blocks of a same shape and size, and all the second electrode blocks 9 may be further designed as electrode blocks of a same shape and size.

Based on a same inventive concept, an embodiment of the present invention further provides a touch detection method. The touch detection method is applied to the foregoing touch display apparatus. With reference to FIG. 4 to FIG. 6, the touch detection method includes: A touch driver chip 10 collects a touch detection signal transmitted through a touch signal line 8, detects a touch status at a location of each touch structure 3 in a touch area 2, and calculates, based on the collected touch detection signal, a touch point coordinate.

With reference to the foregoing analysis of the touch display apparatus structure, the touch display panel 1 is divided into areas, and a plurality of independent touch structures 3 are disposed in each divided touch area 2. Each independent touch structure 3 respectively corresponds to a detection area with a small area. The touch driver chip 10 may separately detect a touch status in a detection area in which each touch structure 3 is located, especially when a multi-finger touch is performed in a large-sized touch display apparatus, a plurality of fingers are more likely to be placed in detection areas in which different touch structures 3 are located. Therefore, when performing independent determining on each detection area, the touch driver chip 10 more easily obtains point coordinates of different finger touch locations, to reduce a risk of misjudgment and improve accuracy of touch detection.

In addition, in this embodiment of the present invention, the touch driver chip 10 only needs to simultaneously receive touch detection signals that are fed back through a touch signal line 8 connected to the touch driver chip 10, to detect a touch status in the touch area 2. Time-sharing detection does not need to be performed, and detection duration is shorter. In addition, a time loss caused by switching between touch switches during time-sharing detection can also be avoided. When a touch electrode and a common electrode are multiplexed, refresh rates of touch and display are effectively improved, and touch and display effects are better.

Figure 17:
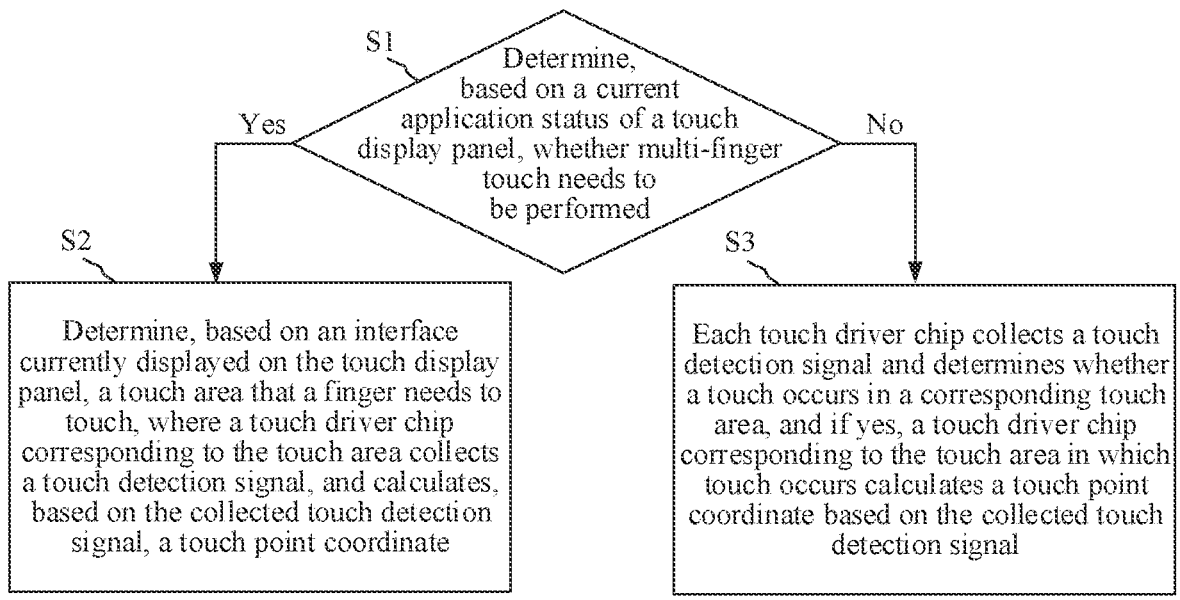
FIG. 17 is a flowchart of a touch detection method according to an embodiment of the present invention.

In an implementation, FIG. 17 is a flowchart of a touch detection method according to an embodiment of the present invention. As shown in FIG. 17, a process in which the touch driver chip 10 collects a touch detection signal transmitted through the touch signal line 8, detects a touch status at a location of each touch structure 3 in the touch area 2, and calculates a touch point coordinate based on the collected touch detection signal includes the following steps.

Step S1: Determine, based on a current application status of a touch display panel 1, whether multi-finger touch needs to be performed, and in a case that multi-finger touch needs to be performed, proceed to step S2, or in a case that multi-finger touch does not need to be performed, proceed to step S3.

For example, in a case that the current application status of the touch display panel 1 is a desktop status, it indicates that a user needs to select an application (APP) on the desktop. In this case, it may be determined that a current touch mode is single-finger touch. For example, in a case that the current application status of the touch display panel 1 is a drawing application status or a game application status, the user needs to perform multi-finger touch to perform drawing control and game control. In this case, it may be determined that the current touch mode is multi-finger touch.

Step S2: Determine, based on an interface currently displayed on the touch display panel 1, a touch area 2 that a finger needs to touch, where a touch driver chip 10 corresponding to the touch area 2 part collects a touch detection signal, and calculates a touch point coordinate based on the collected touch detection signal.

Based on a one-to-one correspondence between the touch area 2 and the touch driver chip 10, when multi-finger touch is performed, in a case that a location that needs to be touched by a plurality of fingers is located only in one or more touch areas 2, touch detection may be performed by using only a touch driver chip 10 corresponding to the part of touch areas 2 in which the touch location is located, and it is unnecessary that all touch driver chips 10 work, to reduce power consumption required for the touch detection.

Step S3: Each touch driver chip 10 collects a touch detection signal and determines whether touch occurs in a corresponding touch area 2, and in a case that touch occurs in a corresponding touch area 2, a touch driver chip 10 corresponding to the touch area 2 in which touch occurs calculates a touch point coordinate based on the collected touch detection signal.

For example, the current application status of the touch display panel 1 is the desktop status. The user needs to perform single-finger touch to select an APP on the desktop to enter. Because it cannot be predicted which APP the user selects to enter, a location of the touch area 2 that a finger needs to touch cannot be predicted. Therefore, all touch driver chips 10 detect touch statuses in the touch areas 2 corresponding to the touch driver chips 10, so that detection accuracy of the single-finger touch can be improved.

Figure 18:
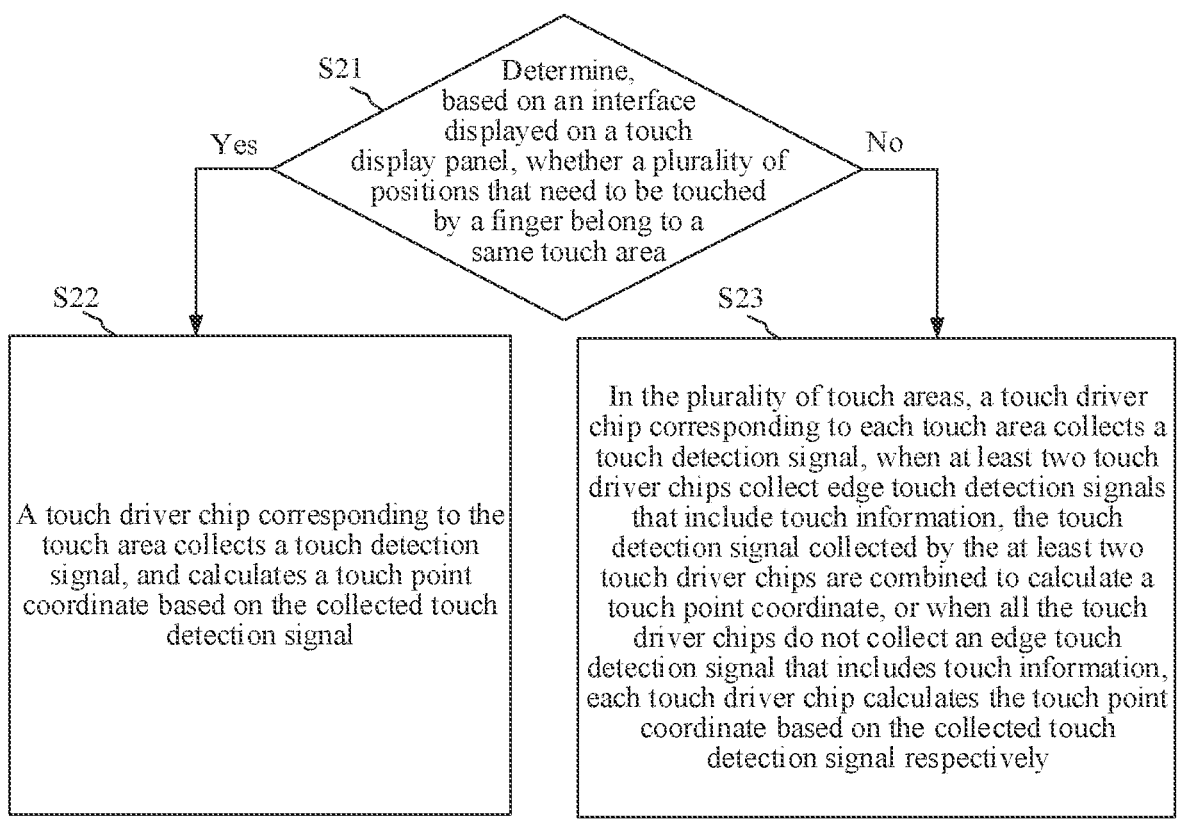
FIG. 18 is another flowchart of a touch detection method according to an embodiment of the present invention.

In an implementation, FIG. 18 is another flowchart of a touch detection method according to an embodiment of the present invention. As shown in FIG. 18, step S2 may specifically include the following steps.

Step S21: Determine, based on an interface displayed on a touch display panel 1, whether a plurality of positions that need to be touched by a finger belong to a same touch area 2, and in a case that the plurality of positions that need to be touched by a finger belong to a same touch area 2, proceed to step S22, or in a case that the plurality of positions that need to be touched by a finger do not belong to a same touch area 2, proceed to step S23.

Step S22: A touch driver chip 10 corresponding to the touch area 2 collects a touch detection signal, and calculates, based on the collected touch detection signal, a plurality of touch point coordinates corresponding to a plurality of fingers.

Step S23: In the plurality of touch areas 2, a touch driver chip 10 corresponding to each touch area 2 collects the touch detection signal. When at least two touch driver chips 10 collect edge touch detection signals that include touch information, the touch detection signal collected by the at least two touch driver chips 10 are combined to calculate touch point coordinates. When all the touch driver chips 10 do not collect an edge touch detection signal that includes touch information, each touch driver chip 10 calculates the touch point coordinates based on the collected touch detection signal respectively.

It should be noted that the edge touch detection signal is a touch detection signal transmitted by a second touch electrode 5 at the edge position of the touch area 2, for example, may be a touch detection signal transmitted by a second touch electrode 5 in one or two columns close to the edge of the touch area 2. When the at least two touch driver chips 10 collect edge touch detection signals including touch information, it indicates that one finger simultaneously touches two adjacent touch areas 2. In this case, touch information of the same finger is separately collected by the at least two different touch driver chips 10. Therefore, the touch detection signals collected by the at least two touch driver chips 10 may be combined to calculate touch point coordinates, to improve accuracy of calculating the touch point coordinates under multi-finger touch.

Further, in time of each frame, the touch driver chip 10 records the calculated touch point coordinate and area position data of the touch area 2 in which touch occurs. When the at least two touch driver chips 10 collect the edge touch detection signals that include the touch information, the touch detection method further includes: correcting, based on touch point coordinates and area position data recorded in a previous frame, touch point coordinates calculated in a current frame, to obtain actual touch point coordinates in the current frame.

In consideration of problems such as misjudgment, when the at least two touch driver 10 chips collect the edge touch detection signals that include the touch information, a plurality of touch point coordinates calculated in the current frame may include coordinates of misjudgment. In this case, the touch point coordinates calculated in the current frame may be corrected with reference to a touch status in a previous frame, to obtain more accurate coordinates, and avoid a case in which a position that is not touched is also triggered.

In addition, the touch detection method provided in this embodiment of the present invention may further include: obtaining final touch coordinates based on a touch algorithm and the touch point coordinates obtained through calculation by the touch driver chip 10.

In this embodiment of the present invention, a plurality of touch driver chips 10 are disposed. During the touch detection, the plurality of touch driver chips 10 perform independent operations. Therefore, after the touch point coordinates are calculated, a secondary operation may be performed on the plurality of touch point coordinates by using a touch algorithm, to verify the touch point coordinates, and improve accuracy of a finally determined touch position.

In addition, it should be further noted that the touch structure 3 provided in this embodiment of the present invention may perform only self-capacitance touch, or may perform only mutual-capacitance touch, or may have both self-capacitance and mutual-capacitance functions, provided that a corresponding touch mode is selected before the touch detection. For example, when it is selected that the touch structure 3 performs self-capacitance touch, both the first touch electrode 4 and the second touch electrode 5 are self-capacitance touch electrodes. During touch detection, the first touch electrode 4 and the second touch electrode 5 feed back touch detection signals to the touch driver chip 10 by using touch signal lines 8 connected to the first touch electrode 4 and the second touch electrode 5. When it is selected that the touch structure 3 is the mutual-capacitance touch structure, the first touch electrode 4 is a touch sensing electrode, and the second touch electrode 5 is a touch driving electrode. During touch detection, the touch driver chip 10 transmits, through a touch signal line 8, a touch driver detection signal to the second touch electrode 5 connected to the touch driver chip 10, and the first touch electrode 4 feeds back a touch induction detection signal to the touch driver chip 10 through a touch signal line 8 connected to the first touch 4.

The foregoing descriptions are merely example embodiments of the present invention, but are not intended to limit the present invention. Any modification, equivalent replacement, or improvement made within the spirit and principle of the present invention should fall within the protection scope of the present invention.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of the present invention.

What is claimed is:

1. A touch display apparatus, comprising:
   a touch display panel, wherein the touch display panel comprises at least one touch area, each of the at least one touch area comprises a plurality of touch structures, each of the plurality of touch structures comprises a plurality of first touch electrodes arranged along a first direction and a plurality of second touch electrodes arranged along a second direction, the plurality of first touch electrodes and the plurality of second touch electrodes are disposed at a same layer and are insulated, and the first direction intersects the second direction, wherein:
      each first touch electrode comprises a plurality of first electrode blocks arranged along the second direction, two adjacent first electrode blocks are connected through a connection part, and each first touch electrode is electrically connected to a respective touch signal line; and
      each second touch electrode comprises a plurality of second electrode blocks arranged along the first direction, and the plurality of second electrode blocks in a respective second touch electrode are electrically connected to a respective touch signal line; and
   at least one touch driver chip, wherein each of the at least one touch driver chip is electrically connected to a touch signal line connected to touch structures in one touch area;
   wherein an orthographic projection of a touch signal line on a plane on which the touch display panel is located runs through an orthographic projection of a plurality of first touch electrodes that are on the touch display panel and that are arranged along the first direction on the plane on which the touch display panel is located.

2. The touch display apparatus according to claim 1, wherein
   the touch display panel comprises a plurality of touch areas, and the plurality of touch areas are arranged along the second direction.

3. The touch display apparatus according to claim 1, wherein
   the plurality of first touch electrodes and the plurality of second touch electrodes are multiplexed as common electrodes; and
   the touch display panel further comprises a sub-pixel, the sub-pixel comprises a pixel electrode, and an orthographic projection of each pixel electrode on a plane on which the touch display panel is located is located in an orthographic projection of a first touch electrode or a second touch electrode on the plane on which the touch display panel is located.

4. The touch display apparatus according to claim 3, wherein
   there is a gap between orthographic projections of any two adjacent pixel electrodes on the plane on which the touch display panel is located, and edges of orthographic projections of the first touch electrode and the second touch electrode on the plane on which the touch display panel is located are located in the gap.

5. The touch display apparatus according to claim 1, wherein
   patterns of the plurality of first electrode blocks after translation coincide, and patterns of the plurality of second electrode blocks after translation coincide.

6. The touch display apparatus according to claim 1, wherein the plurality of first touch electrodes and the plurality of second touch electrodes are self-capacitance touch electrodes.

7. The touch display apparatus according to claim 1, wherein the first touch electrode is a touch sensing electrode, and the second touch electrode is a touch driving electrode.

8. A touch display apparatus, comprising:
   a touch display panel, wherein the touch display panel comprises a plurality of touch areas, each of the plurality of touch areas comprises a first touch area and a second touch area, and the first touch area and the second touch area respectively comprise a plurality of touch structures; and
   a plurality of touch driver chips, wherein each of the plurality of touch driver chips comprises a first touch chip and a second touch chip, the first touch chip is electrically connected to a touch signal line connected to a touch structure in the first touch area, and the second touch chip is electrically connected to a touch signal line connected to a touch structure in the second touch area;
   wherein each of the plurality of touch structures comprises a plurality of first touch electrodes and a plurality of second touch electrodes, the plurality of first touch electrodes are arranged along a first direction, the plurality of second touch electrodes are arranged along a second direction, the plurality of first touch electrodes and the plurality of second touch electrodes are disposed at a same layer and are insulated, and the first direction intersects the second direction;

each first touch electrode comprises a plurality of first electrode blocks arranged along the second direction, two adjacent first electrode blocks are connected through a connection part, and each first touch electrode is electrically connected to a respective touch signal line; and each second touch electrode comprises a plurality of second electrode blocks arranged along the first direction, and the plurality of second electrode blocks in a respective second touch electrode are electrically connected to a respective touch signal line.

9. The touch display apparatus according to claim 8, wherein
the plurality of touch areas are arranged in a same direction, and an arrangement direction of the plurality of touch areas intersects an extension direction of a touch signal line.

10. The touch display apparatus according to claim 8, wherein
in a direction of a plane on which the touch display panel is located, an orthographic projection of a touch signal line runs through orthographic projections of a plurality of first touch electrodes arranged along the first direction on the touch display panel.

11. The touch display apparatus according to claim 8, wherein
each of the plurality of touch structures comprises a plurality of first touch electrodes and a plurality of second touch electrodes, and the plurality of first touch electrodes and the plurality of second touch electrodes are alternately arranged in a second direction; and
each first touch electrode comprises first electrode blocks arranged along a first direction, each first electrode block is electrically connected to a respective touch signal line, and each second touch electrode comprises second electrode blocks arranged along the first direction, each second electrode block is electrically connected to a respective touch signal line, and the first direction intersects the second direction, wherein
each first electrode block comprises a first electrode part and a second electrode part that are arranged along the first direction, a width of the first electrode part in the second direction is less than a width of the second electrode part in the second direction, each second electrode block comprises a third electrode part and a fourth electrode part that are arranged along the first direction, and a width of the third electrode part in the second direction is greater than a width of the fourth electrode part in the second direction.

12. The touch display apparatus according to claim 11, wherein
along the first direction, a width of a first electrode block in the second direction increases successively, and a width of a second electrode block in the second direction decreases successively.

13. The touch display apparatus according to claim 11, wherein
a touch signal line comprises a first end part and a second end part, the first end part is electrically connected to a touch driver chip, and second end parts of a plurality of touch signal lines are aligned.

14. A touch display panel, wherein the touch display panel comprises at least one touch area, each of the at least one touch area comprises a plurality of touch structures, each of the plurality of touch structures comprises a plurality of first touch electrodes arranged along a first direction and a plurality of second touch electrodes arranged along a second direction, the plurality of first touch electrodes and the plurality of second touch electrodes are disposed at a same layer and are insulated, and the first direction intersects the second direction, wherein:

each first touch electrode comprises a plurality of first electrode blocks arranged along the second direction, two adjacent first electrode blocks are connected through a connection part, and each first touch electrode is electrically connected to a respective touch signal line; and each second touch electrode comprises a plurality of second electrode blocks arranged along the first direction, and the plurality of second electrode blocks in a respective second touch electrode are electrically connected to a respective touch signal line; and wherein each of at least one touch driver chip is electrically connected to a touch signal line connected to touch structures in one touch area;

wherein an orthographic projection of a touch signal line on a plane on which the touch display panel is located runs through an orthographic projection of a plurality of first touch electrodes that are on the touch display panel and that are arranged along the first direction on the plane on which the touch display panel is located.

15. The touch display panel of claim 14, wherein the touch display panel comprises a plurality of touch areas, and the plurality of touch areas are arranged along the second direction.

16. The touch display panel of claim 14, wherein the plurality of first touch electrodes and the plurality of second touch electrodes are multiplexed as common electrodes; and
the touch display panel further comprises a sub-pixel, the sub-pixel comprises a pixel electrode, and an orthographic projection of each pixel electrode on a plane on which the touch display panel is located is located in an orthographic projection of a first touch electrode or a second touch electrode on the plane on which the touch display panel is located.

17. The touch display panel of claim 16, wherein there is a gap between orthographic projections of any two adjacent pixel electrodes on the plane on which the touch display panel is located, and edges of orthographic projections of the first touch electrode and the second touch electrode on the plane on which the touch display panel is located are located in the gap.

18. The touch display panel of claim 14, wherein patterns of the plurality of first electrode blocks after translation coincide, and patterns of the plurality of second electrode blocks after translation coincide.

19. The touch display panel of claim 14, wherein both the first touch electrode and the second touch electrode are self-capacitance touch electrodes.

20. The touch display panel of claim 14, wherein the first touch electrode is a touch sensing electrode, and the second touch electrode is a touch driving electrode.

* * * * *